(12) United States Patent
Wang et al.

(10) Patent No.: US 11,539,891 B2
(45) Date of Patent: *Dec. 27, 2022

(54) PREVIEW-IMAGE DISPLAY METHOD AND TERMINAL DEVICE

(71) Applicant: Huawei Technologies Co., Ltd., Shenzhen (CN)

(72) Inventors: Huali Wang, Shenzhen (CN); Lina Tao, Shenzhen (CN); Duan Li, Shenzhen (CN); Xueyan Huang, Shenzhen (CN); Tizheng Wang, Shenzhen (CN); Hongkai Zhou, Shenzhen (CN); Jiali Fu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/531,498

(22) Filed: Nov. 19, 2021

(65) Prior Publication Data

US 2022/0078356 A1 Mar. 10, 2022

Related U.S. Application Data

(63) Continuation of application No. 17/138,490, filed on Dec. 30, 2020, now Pat. No. 11,196,931, which is a
(Continued)

(30) Foreign Application Priority Data

Feb. 23, 2017 (CN) .......................... 201710100499.7

(51) Int. Cl.
*H04N 5/232* (2006.01)
*G06T 7/12* (2017.01)
(Continued)

(52) U.S. Cl.
CPC ......... *H04N 5/232935* (2018.08); *G06T 7/12* (2017.01); *G06T 7/13* (2017.01);
(Continued)

(58) Field of Classification Search
CPC ......... H04N 5/232935; H04N 5/23245; H04N 5/265; H04N 5/23222; H04N 5/23218; H04N 5/232939; G06T 7/12; G06T 7/13
(Continued)

(56) References Cited

U.S. PATENT DOCUMENTS 8,345,141 B2 1/2013 Yumiki
8,400,519 B2 3/2013 Choi
(Continued)

FOREIGN PATENT DOCUMENTS

CN 101706706 A 5/2010
CN 102436342 A 5/2012
(Continued)

OTHER PUBLICATIONS

U.S. Appl. No. 17/138,490, filed Dec. 30, 2017.
U.S. Appl. No. 16/549,881, filed Aug. 23, 2019.

*Primary Examiner* — Pritham D Prabhakher
(74) *Attorney, Agent, or Firm* — Leydig, Voit & Mayer, Ltd.

(57) ABSTRACT

The present disclosure discloses a preview-image display while a terminal device photographs a picture. The method comprises: obtaining a first preview image and a second preview image, wherein the first preview image is generated based on a first photographing mode and the second preview image is generated based on a second photographing mode; and displaying a first part of the first preview image and a second part of the second preview image at the same time.

20 Claims, 14 Drawing Sheets

Related U.S. Application Data continuation of application No. 16/549,881, filed on Aug. 23, 2019, now Pat. No. 10,911,682, which is a continuation of application No. PCT/CN2017/102341, filed on Sep. 19, 2017.

(51) Int. Cl.
 *G06T 7/13* (2017.01)
 *H04N 5/265* (2006.01)

(52) U.S. Cl.
 CPC ..... *H04N 5/23218* (2018.08); *H04N 5/23222* (2013.01); *H04N 5/23245* (2013.01); *H04N 5/232939* (2018.08); *H04N 5/265* (2013.01)

(58) Field of Classification Search
 USPC .................................................. 348/333.02
 See application file for complete search history.

(56) References Cited

U.S. PATENT DOCUMENTS

| | | | |
|---|---|---|---|
| 8,615,112 B2 * | 12/2013 | Takano | G06T 11/00 348/207.99 |
| 8,736,736 B2 | 5/2014 | Hoshino et al. | |
| 8,823,857 B2 * | 9/2014 | Kazama | H04N 5/232935 348/333.05 |
| 9,001,255 B2 | 4/2015 | Matsuzawa et al. | |
| 9,270,901 B2 | 2/2016 | Iki | |
| 9,307,151 B2 | 4/2016 | Son et al. | |
| 9,311,522 B2 * | 4/2016 | Lee | G06V 40/161 |
| 9,503,645 B2 | 11/2016 | Ju et al. | |
| 9,509,916 B2 | 11/2016 | Li et al. | |
| 9,681,055 B2 | 6/2017 | Ju et al. | |
| 9,706,106 B2 | 7/2017 | Kang et al. | |
| 9,891,706 B2 | 2/2018 | Ha | |
| 9,948,863 B2 | 4/2018 | Li et al. | |
| 10,021,294 B2 | 7/2018 | Kwon et al. | |
| 10,075,629 B2 | 9/2018 | Wada | |
| 10,154,186 B2 | 12/2018 | Kang et al. | |
| 10,200,597 B2 | 2/2019 | Choi et al. | |
| 10,740,946 B2 * | 8/2020 | Liu | G06T 7/70 |
| 2007/0140675 A1 | 6/2007 | Yanagi | |
| 2008/0024643 A1 | 1/2008 | Kato | |
| 2008/0240563 A1 * | 10/2008 | Takano | H04N 5/23219 382/173 |
| 2011/0033092 A1 * | 2/2011 | Lee | G06V 40/161 382/118 |
| 2011/0043655 A1 | 2/2011 | Park et al. | |
| 2011/0234853 A1 * | 9/2011 | Hayashi | G03B 13/02 348/E5.055 |
| 2012/0268641 A1 | 10/2012 | Kazama | |
| 2012/0307112 A1 * | 12/2012 | Kunishige | H04N 5/907 348/E5.051 |
| 2013/0033615 A1 | 2/2013 | Ecrement | |
| 2013/0083222 A1 * | 4/2013 | Matsuzawa | H04N 5/232935 348/222.1 |
| 2013/0155308 A1 * | 6/2013 | Wu | H04N 5/23219 348/333.05 |
| 2013/0235226 A1 | 9/2013 | Karn et al. | |
| 2013/0314580 A1 | 11/2013 | Ju et al. | |
| 2014/0118600 A1 | 5/2014 | Son et al. | |
| 2014/0204236 A1 | 7/2014 | Yoon et al. | |
| 2014/0204244 A1 | 7/2014 | Choi et al. | |
| 2015/0109507 A1 | 4/2015 | Li et al. | |
| 2016/0255268 A1 * | 9/2016 | Kang | G06F 3/04847 348/333.11 |
| 2016/0323503 A1 * | 11/2016 | Wada | H04N 5/23218 |
| 2017/0013179 A1 * | 1/2017 | Kang | H04N 5/23296 |
| 2017/0034448 A1 | 2/2017 | Ju et al. | |
| 2017/0070670 A1 | 3/2017 | Kwon et al. | |
| 2019/0005700 A1 | 1/2019 | Liu | |

FOREIGN PATENT DOCUMENTS

| | | |
|---|---|---|
| CN | 103945127 A | 7/2014 |
| CN | 104333689 A | 2/2015 |
| CN | 105323456 A | 2/2016 |
| CN | 105635566 A | 6/2016 |
| CN | 105657239 A | 6/2016 |
| CN | 106937045 A | 7/2017 |
| JP | 2009141978 A | 6/2009 |
| TW | 201015977 A | 4/2010 |
| WO | 2014114238 A1 | 7/2014 |

* cited by examiner

PREVIEW-IMAGE DISPLAY METHOD AND TERMINAL DEVICE

CROSS-REFERENCE TO RELATED APPLICATIONS

This application is a continuation of U.S. patent application Ser. No. 17/138,490, filed on Dec. 30, 2020, which is a continuation of U.S. patent application Ser. No. 16/549,881, filed on Aug. 23, 2019, now U.S. Pat. No. 10,911,682, which is a continuation of International Application No. PCT/CN2017/102341, filed on Sep. 19, 2017, which claims priority to Chinese Patent Application No. 201710100499.7, filed on Feb. 23, 2017. All of the afore-mentioned patent applications are hereby incorporated by reference in their entireties.

TECHNICAL FIELD

This application relates to the communications field, and in particular, to a preview-image display method and a terminal device.

BACKGROUND

With popularity of terminal devices having a photographing function, such as smartphones, tablet computers (PAD), and digital cameras, an increasing quantity of users use the terminal devices to take pictures. In a process in which a user takes a picture, when the user needs to view differences between preview images that are of a current photographing screen and that are in different photographing modes in terms of color, exposure, tone, and the like, a terminal device can display the preview images that are of the current photographing screen and that are in the different photographing modes.

Two main methods for displaying preview images that are of a current photographing screen and that are in different photographing modes are provided in the prior art. In a solution in the prior art 1, a terminal device may provide a plurality of photographing modes. When a user turns on a photographing function of the terminal device, the terminal device may display a preview image that is of a current photographing screen and that is in each photographing mode and a preview image in an artwork master mode, so that the user decides to use which photographing mode to take pictures. In a solution in the prior art 2, when a user turns on a photographing function of a terminal device, the terminal device may select a photographing mode from a plurality of provided photographing modes based on an automatically identified photographed object, to recommend the photographing mode to the user. After the user uses the photographing mode to take pictures, the terminal device directly displays a preview image of that is a current photographing screen and that is in the photographing mode, and displays a comparison key. If the user needs to view differences between preview images that are of the current photographing screen and that are in different photographing modes, the user may tap the comparison key. In this way, the terminal device may display, based on an operation performed by the user on the comparison key, a preview image that is of the current photographing screen and that is in another photographing mode different from the photographing mode, so that the user decides, based on a difference between viewed preview images that are of the current photographing screen and that are in different photographing modes, whether to save the preview image that is of the current photographing screen and that is in the photographing mode.

The prior art has at least the following problems:

In the prior art 1, the terminal device displays, in a nine-patch form, the preview image that is of the current photographing screen and that is in each photographing mode and the preview image in the artwork master mode. In this display method, a size of a displayed preview image is small, causing inconvenience to the user when the user views differences between preview images that are of the current photographing screen and that are in different photographing modes.

In the prior art 2, the terminal device displays, on two different display interfaces based on the operation performed by the user on the comparison key, the preview images that are of the current photographing screen and that are in the different photographing modes. In this display method, the terminal cannot simultaneously display the preview images that are of the current photographing screen and that are in the different photographing modes, causing inconvenience to the user when the user views the differences between the preview images that are of the current photographing screen and that are in the different photographing modes.

SUMMARY

Embodiments of the present invention provide a preview-image display method and a terminal device, resolving a problem that it is inconvenient for a user to view differences between preview images that are of a current photographing screen and that are in different photographing modes.

To achieve the foregoing objective, the following technical solutions are used in the embodiments of the present invention:

According to a first aspect of the embodiments of the present invention, a preview-image display method is provided. The method includes: obtaining, by a terminal device, a first preview image during photographing, where the first preview image is a preview image that is of a current photographing screen and that is in a first photographing mode; determining a second photographing mode; obtaining a second preview image, where the second preview image is a preview image that is of the current photographing screen and that is in the second photographing mode; determining a first part of the first preview image and a second part of the second preview image according to a preset rule; and displaying the first part of the first preview image and the second part of the second preview image in a preview area. The first photographing mode is a preset mode, an artwork master mode, a mode used for last photographing, a mode having a highest use frequency, or an adaptive mode (where for example, the adaptive mode is a night mode). The second photographing mode is one of a plurality of photographing modes supported by the terminal device. The photographing mode is used to determine a processing parameter for processing the current photographing screen, and the processing parameter includes at least one of the following: white balance, exposure, a depth of field, saturation, contrast, brightness, a halo, sharpening, fuzzy processing, vignetting, an overall tone, and a color temperature.

According to the preview-image display method provided in this embodiment of the present invention, after obtaining the first preview image and the second preview image, the terminal device may determine the first part of the first preview image and the second part of the second preview image according to the preset rule, and display the determined first part of the first preview image and the determined second part of the second preview image in the preview area. In this way, the terminal device divides the preview area into two parts, to respectively display a part of the preview image that is of the current photographing screen and that is in the first photographing mode and a part of the preview image that is of the current photographing screen and that is in the second photographing mode. Therefore, even though a size of a preview image displayed on the terminal device is small, a user can clearly discern differences between preview images that are of the current photographing screen and that are in different photographing modes, and even though the terminal device cannot simultaneously display the preview images that are of the current photographing screen and that are in the different photographing modes, the user can easily perceive the differences between the preview images that are of the current photographing screen and that are in the different photographing modes, thereby providing convenience for the user when the user views the differences between the preview images that are of the current photographing screen and that are in the different photographing modes.

With reference to the first aspect, in a first possible implementation, the determining, by the terminal device, a first part of the first preview image and a second part of the second preview image according to a preset rule may specifically include: determining, by the terminal device, the first part of the first preview image and the second part of the second preview image, where the first part of the first preview image and the second part of the second preview image constitute the current photographing screen, or the first part of the first preview image and the second part of the second preview image have same corresponding content, or content included in the first part of the first preview image is not the same as content included in the second part of the second preview image.

With reference to the first aspect and the foregoing possible implementation, in another possible implementation, the preview area includes a first area and a second area. In this case, the determining, by the terminal device, a first part of the first preview image and a second part of the second preview image according to a preset rule may specifically include: determining, by the terminal device, the first area based on preset first resolution, and determining the second area based on preset second resolution; and determining a part that corresponds to the first preview image in the first area as the first part of the first preview image and a part that corresponds to the second preview image in the second area as the second part of the second preview image.

With reference to the first aspect and the foregoing possible implementation, in another possible implementation, before the determining, by the terminal device, a first part of the first preview image and a second part of the second preview image according to a preset rule, the method may further include: displaying, by the terminal device, a division line in the preview area, where the division line divides the preview area into a first area and a second area. In this case, the determining, by the terminal device, a first part of the first preview image and a second part of the second preview image according to a preset rule may specifically include: determining, by the terminal device based on a display position of the division line in the preview area, a part that corresponds to the first preview image in the first area as the first part of the first preview image and a part that corresponds to the second preview image in the second area as the second part of the second preview image.

With reference to the first aspect and the foregoing possible implementations, in another possible implementation, after the displaying, by the terminal device, the first part of the first preview image and the second part of the second preview image in a preview area, the method may further include: receiving, by the terminal device, a switching instruction of a user, where the switching instruction is used to switch content displayed in the first area and the second area; and displaying, according to the switching instruction, a third part of the first preview image and a fourth part of the second preview image in the preview area. The third part of the first preview image and the first part of the first preview image constitute the complete first preview image, and the fourth part of the second preview image and the second part of the second preview image constitute the complete second preview image.

With reference to the first aspect and the foregoing possible implementation, in another possible implementation, after the displaying, by the terminal device, the first part of the first preview image and the second part of the second preview image in a preview area, the method may further include: receiving, by the terminal device, a movement instruction of a user, where the movement instruction is used to move the division line; and moving a position of the division line in the preview area according to the movement instruction.

With reference to the first aspect and the foregoing possible implementations, in another possible implementation, the displaying, by the terminal device, a division line in the preview area may specifically include: receiving, by the terminal device, a tracing instruction of the user, where the tracing instruction is used to determine a traced track; determining the traced track according to the tracing instruction; and displaying the division line in the preview area based on the traced track.

With reference to the first aspect and the foregoing possible implementations, in another possible implementation, the displaying, by the terminal device, a division line in the preview area may specifically include: identifying, by the terminal device, at least one material object included in the current photographing screen; determining a contour of each of the at least one material object; and displaying the division line based on the contour of each of the at least one material object.

With reference to the first aspect and the foregoing possible implementation, in another possible implementation, the displaying, by the terminal device, the division line based on the contour of each of the at least one material object may specifically include: displaying, by the terminal device, a division line between corresponding positions of different material objects based on the contour of each of the at least one material object; or displaying, by the terminal device, a division line at a position corresponding to a contour of any one of the at least one material object.

With reference to the first aspect and the foregoing possible implementations, in another possible implementation, after the displaying, by the terminal device, the first part of the first preview image and the second part of the second preview image in a preview area, the method may further include: displaying, by the terminal device, a full-screen identifier in the preview area; receiving a full-screen confirmation instruction of the user for the full-screen identifier, where the full-screen confirmation instruction is used to display the first preview image or the second preview image; and displaying the first preview image or the second preview image in the preview area according to the full-screen confirmation instruction.

With reference to the first aspect and the foregoing possible implementations, in another possible implementation, the determining, by the terminal device, a second photographing mode may specifically include: determining, by the terminal device, a photographed object in the current photographing screen and a type of the photographed object; determining, in a plurality of photographing modes supported by the terminal device, a photographing mode corresponding to the type as a candidate photographing mode; displaying, by the terminal device, prompt information, where the prompt information is used to prompt the user whether to agree on photographing in the candidate photographing mode; determining the candidate photographing mode as the second photographing mode if the terminal device receives a selection confirmation instruction of the user for the prompt information within a preset time period, where the selection confirmation instruction is used to determine the candidate photographing mode as the second photographing mode; and displaying a selection list if the terminal device receives a first selection instruction of the user for the prompt information within the preset time period, and after receiving a second selection instruction of the user, determining the second photographing mode according to the second selection instruction, where the selection list includes a photographing mode that is in the plurality of photographing modes supported by the terminal device and that is different from the candidate photographing mode, the first selection instruction is used to display the selection list, and the second selection instruction is used to determine the second photographing mode in the selection list.

With reference to the first aspect and the foregoing possible implementations, in another possible implementation, the determining, by the terminal device, a second photographing mode may specifically include: displaying, by the terminal device, at least one photographing mode; receiving a mode selection instruction of the user, where the mode selection instruction is used to determine the second photographing mode in the at least one photographing mode; and determining the second photographing mode according to the mode selection instruction.

With reference to the first aspect and the foregoing possible implementations, in another possible implementation, the determining, by the terminal device, a second photographing mode may specifically include: determining, by the terminal device, a photographed object in the current photographing screen and a type of the photographed object; and determining, in a plurality of photographing modes supported by the terminal device, a photographing mode corresponding to the type as the second photographing mode.

According to a second aspect of the embodiments of the present invention, a terminal device is provided. The terminal device includes an obtaining unit, a determining unit, and a display unit. The obtaining unit is configured to obtain a first preview image during photographing, where the first preview image is a preview image that is of a current photographing screen and that is in a first photographing mode. The determining unit is configured to determine a second photographing mode. The obtaining unit is further configured to obtain a second preview image, where the second preview image is a preview image that is of the current photographing screen and that is in the second photographing mode. The determining unit is further configured to determine, according to a preset rule, a first part of the first preview image and a second part of the second preview image that are obtained by the obtaining unit. The display unit is configured to display, in a preview area, the first part of the first preview image and the second part of the second preview image that are determined by the determining unit.

With reference to the second aspect, in a possible implementation, the determining unit is specifically configured to: determine the first part of the first preview image and the second part of the second preview image, where the first part of the first preview image and the second part of the second preview image constitute the current photographing screen; or the first part of the first preview image and the first part of the second preview image have same corresponding content.

With reference to the second aspect and the foregoing possible implementation, in another possible implementation, the preview area includes a first area and a second area. The determining unit is specifically configured to: determine the first area based on preset first resolution, and determine the second area based on preset second resolution; and determine a part that corresponds to the first preview image in the first area as the first part of the first preview image and a part that corresponds to the second preview image in the second area as the second part of the second preview image.

With reference to the second aspect and the foregoing possible implementation, in another possible implementation, the display unit is further configured to display a division line in the preview area, where the division line divides the preview area into a first area and a second area. The determining unit is specifically configured to determine, based on a display position that is of the division line displayed by the display unit and that is in the preview area, a part that corresponds to the first preview image in the first area as the first part of the first preview image and a part that corresponds to the second preview image in the second area as the second part of the second preview image.

With reference to the second aspect and the foregoing possible implementations, in another possible implementation, the terminal device further includes a receiving unit. The receiving unit is configured to receive a switching instruction of a user, where the switching instruction is used to switch content displayed in the first area and the second area. The display unit is further configured to display, according to the switching instruction received by the receiving unit, a third part of the first preview image and a fourth part of the second preview image in the preview area. The third part of the first preview image and the first part of the first preview image constitute the complete first preview image, and the fourth part of the second preview image and the second part of the second preview image constitute the complete second preview image.

With reference to the second aspect and the foregoing possible implementation, in another possible implementation, the terminal device further includes a receiving unit and a movement unit. The receiving unit is configured to receive a movement instruction of a user, where the movement instruction is used to move the division line. The movement unit is configured to move a position of the division line in the preview area according to the movement instruction received by the receiving unit.

With reference to the second aspect and the foregoing possible implementations, in another possible implementation, the display unit is specifically configured to: receive a tracing instruction of the user, where the tracing instruction is used to determine a traced track; determine the traced track according to the tracing instruction; and display the division line in the preview area based on the traced track.

With reference to the second aspect and the foregoing possible implementations, in another possible implementation, the display unit is further configured to: identify at least one material object included in the current photographing screen; determine a contour of each of the at least one material object; and display the division line based on the contour of each of the at least one material object.

With reference to the second aspect and the foregoing possible implementations, in another possible implementation, the display unit is specifically configured to display a full-screen identifier in the preview area. The receiving unit is further configured to receive a full-screen confirmation instruction of the user for the full-screen identifier displayed by the display unit, where the full-screen confirmation instruction is used to display the first preview image or the second preview image. The display unit is further configured to display the first preview image or the second preview image in the preview area according to the full-screen confirmation instruction received by the receiving unit.

With reference to the second aspect and the foregoing possible implementations, in another possible implementation, the determining unit is specifically configured to: determine a photographed object in the current photographing screen and a type of the photographed object; determine, in a plurality of photographing modes supported by the terminal device, a photographing mode corresponding to the type as a candidate photographing mode; display prompt information, where the prompt information is used to prompt the user whether to agree on photographing in the candidate photographing mode; determine the candidate photographing mode as the second photographing mode if a selection confirmation instruction of the user for the prompt information is received within a preset time period, where the selection confirmation instruction is used to determine the candidate photographing mode as the second photographing mode; and display a selection list if a first selection instruction of the user for the prompt information is received within the preset time period, and after receiving a second selection instruction of the user, determine the second photographing mode according to the second selection instruction, where the selection list includes a photographing mode that is in the plurality of photographing modes supported by the terminal device and that is different from the candidate photographing mode, the first selection instruction is used to display the selection list, and the second selection instruction is used to determine the second photographing mode in the selection list.

With reference to the second aspect and the foregoing possible implementations, in another possible implementation, the determining unit is specifically configured to: display at least one photographing mode; receive a mode selection instruction of the user, where the mode selection instruction is used to determine the second photographing mode in the at least one photographing mode; and determine the second photographing mode according to the mode selection instruction.

With reference to the second aspect and the foregoing possible implementations, in another possible implementation, the determining unit is specifically configured to: determine a photographed object in the current photographing screen and a type of the photographed object; and determine, in a plurality of photographing modes supported by the terminal device, a photographing mode corresponding to the type as the second photographing mode.

For specific implementations, refer to behavioral functions of the terminal device in the preview-image display method provided in the first aspect or any possible implementation of the first aspect.

According to a third aspect of the embodiments of the present invention, a terminal device is provided. The terminal device includes a processor, a memory, and a display. The memory is configured to store an instruction. The processor is configured to invoke the instruction stored in the memory, to: obtain a first preview image during photographing, where the first preview image is a preview image that is of a current photographing screen and that is in a first photographing mode; determine a second photographing mode; obtain a second preview image, where the second preview image is a preview image that is of the current photographing screen and that is in the second photographing mode; and determine, according to a preset rule, a first part of the first preview image and a second part of the second preview image. The display is configured to display the first part of the first preview image and the second part of the second preview image in a preview area.

According to fourth aspect of the embodiments of the present invention, a computer storage medium is provided. The computer storage medium is configured to store a computer software instruction used by the foregoing terminal device, where the computer software instruction includes a program designed for executing the foregoing preview-image display method.

DESCRIPTION OF EMBODIMENTS

Figure 1:
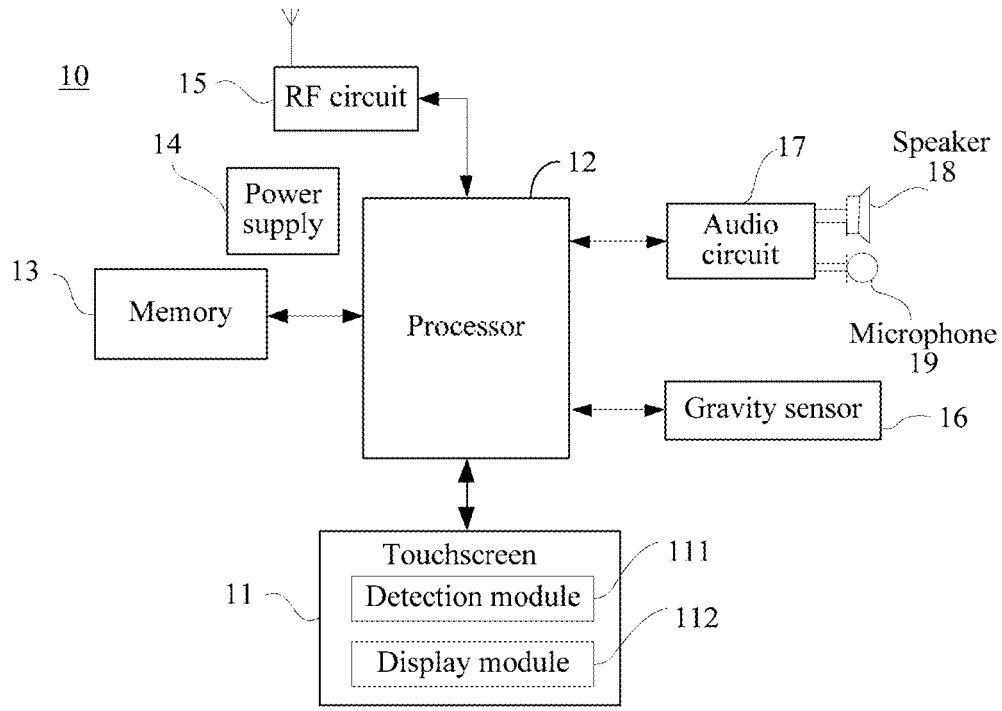
FIG. 1 is a schematic composition diagram of a terminal device according to an embodiment of the present invention.

To resolve a problem that it is inconvenient for a user to view differences between preview images that are of a current photographing screen and that are in different photographing modes, the embodiments of the present invention provide a preview-image display method. A basic principle of the method is: obtaining, by a terminal device, a first preview image during photographing, where the first preview image is a preview image that is of a current photographing screen and that is in a first photographing mode; determining a second photographing mode; obtaining a second preview image, where the second preview image is a preview image that is of the current photographing screen and that is in the second photographing mode; determining a first part of the first preview image and a second part of the second preview image according to a preset rule; and displaying the first part of the first preview image and the second part of the second preview image in a preview area. In this way, the terminal device divides the preview area into two parts, to respectively display a part of the preview image that is of the current photographing screen and that is in the first photographing mode and a part of the preview image that is of the current photographing screen and that is in the second photographing mode. Therefore, even though a size of a preview image displayed on the terminal device is small, a user can clearly discern differences between preview images that are of the current photographing screen and that are in different photographing modes, and even though the terminal device cannot simultaneously display the preview images that are of the current photographing screen and that are in the different photographing modes, the user can easily perceive the differences between the preview images that are of the current photographing screen and that are in the different photographing modes, thereby providing convenience for the user when the user views the differences between the preview images that are of the current photographing screen and that are in the different photographing modes.

The following describes implementations of the embodiments of the present invention in detail with reference to accompanying drawings.

It should be noted that the preview-image display method provided in the embodiments of the present invention is applicable to a terminal device having a photographing function. The terminal device may be a mobile phone, a tablet computer, a digital camera, a notebook computer, an ultra-mobile personal computer (Ultra-mobile Personal Computer, UMPC), a netbook, a personal digital assistant (Personal Digital Assistant, PDA), or the like.

Specifically, that the terminal device is a mobile phone is used as an example in the embodiments of the present invention to describe the preview-image display method provided in the present invention. The following specifically describes components of a mobile phone 10 with reference to the accompanying drawings.

As shown in FIG. 1, the mobile phone 10 may include components such as a touchscreen 11, a processor 12, a memory 13, a power supply 14, a radio frequency (Radio Frequency, RF) circuit 15, a gravity sensor (Gravity Sensor) 16, an audio circuit 17, a speaker 18, and a microphone 19. These components may be connected by using a bus or directly. A person skilled in the art may understand that the structure of the mobile phone shown in FIG. 1 does not constitute any limitation to the mobile phone, and the mobile phone may include more components than those shown in the figure, or some components may be combined, or a different component deployment may be used.

The touchscreen 11, which may also be referred to as a touch display panel, is configured to implement input and output functions of the mobile phone 10, and may collect a touch operation of a user on or near the touchscreen 11 (such as an operation of the user on or near the touchscreen 11 by using any suitable object or accessory such as a finger or a stylus), and drive a corresponding connection apparatus based on a preset program. The touchscreen 11 may further be configured to display information entered by or provided to the user (for example, an image collected through a camera) and various menus on the mobile phone. For example, the touchscreen 11 may be implemented into a plurality of types such as a resistive, capacitive, infrared, or surface acoustic wave type touchscreen. This is not limited in the embodiments of the present invention.

Specifically, in the embodiments of the present invention, the touchscreen 11 may include a detection module 111 and a display module 112. The detection module 111 may detect a trigger operation performed by the user on the touchscreen 11. For example, in the embodiments of the present invention, the detection module 111 may detect a division line displayed on the touchscreen 11 touched by the user. The detection module 111 may also detect a trigger operation performed by the user on a full-screen identifier displayed on the touchscreen 11. The display module 112 may be configured to display information entered by the user or information provided on the mobile phone for the user and various menus on the mobile phone. For example, in the embodiments of the present invention, the display module 112 may display a division line, a first part of a first preview image, a second part of a second preview image, prompt information, a full-screen identifier, and the like.

The processor 12 is a control center of the mobile phone 10, and is connected to various parts of the entire mobile phone by using various interfaces and lines. By running or executing a software program and/or module stored in the memory 13, and invoking data stored in the memory 13, the processor 12 performs various functions of the mobile phone 10 and processes data, thereby performing overall monitoring on the mobile phone 10. During specific implementation, in an embodiment, the processor 12 may include one or more processing units. The processor 12 may integrate an application processor and a modem processor. The application processor mainly processes an operating system, a user interface, an application, and the like. The modem processor mainly processes wireless communication. It may be understood that the foregoing modem processor may alternatively not be integrated into the processor 12.

Specifically, in the embodiments of the present invention, the processor 12 may obtain the first preview image, determine a second photographing mode, obtain the second preview image, and determine the first part of the first preview image and the second part of the second preview image.

The memory 13 may be configured to store data, a software program, and a module, and may be a volatile memory (Volatile Memory), for example, a random access memory (Random-Access Memory, RAM); or a non-volatile memory (Non-Volatile Memory), for example, a read-only memory (Read-Only Memory, ROM), a flash memory (Flash Memory), a hard disk drive (Hard Disk Drive, HDD), or a solid-state drive (Solid-State Drive, SSD); or a combination of the foregoing types of memories. Specifically, the memory 13 may store the program code. The program code is configured to enable the processor 12 to execute the program code, to perform the preview-image display method provided in the embodiments of the present invention.

The power supply 14 may be a battery, and is logically connected to the processor 12 by using a power management system, thereby implementing functions such as charging, discharging, and power consumption management by using the power management system.

The RF circuit 15 may be configured to receive and send signals during an information receiving and sending process or a call process. Particularly, the RF circuit 15 sends received information to the processor 12 for processing, and sends a signal generated by the processor 12. Usually, the RF circuit includes, but is not limited to, an antenna, at least one amplifier, a transceiver, a coupler, a low noise amplifier (Low Noise Amplifier, LNA), a duplexer, and the like. In addition, the RF circuit 15 may further communicate with a network and another device through wireless communication.

The gravity sensor (gravity sensor) 16 may detect magnitude of accelerations of the mobile phone in various directions (which are generally triaxial), may detect magnitude and a direction of gravity when the mobile phone is static, and may be used for an application that identifies a mobile phone posture (for example, switching between a horizontal screen and a vertical screen, a related game, and magnetometer posture calibration), a function related to vibration identification (for example, a pedometer and a knock), and the like. It should be noted that the mobile phone 10 may further include other sensors, such as a pressure sensor, an optical sensor, a gyroscope, a barometer, a hygrometer, a thermometer, an infrared sensor. Details are not described herein.

The audio circuit 17, the speaker 18, and the microphone 19 may provide an audio interface between the user and the mobile phone 10. The audio circuit 17 may convert received audio data into an electrical signal and transmit the electrical signal to the speaker 18. The speaker 18 converts the electrical signal into a sound signal for output. In addition, the microphone 19 converts a collected sound signal into an electrical signal. The audio circuit 17 receives the electrical signal, converts the electrical signal into audio data, and outputs the audio data to the RF circuit 15 to send the audio data to, for example, another mobile phone, or outputs the audio data to the processor 12 for further processing.

Although not shown, the mobile phone 10 may further include functional modules such as a wireless fidelity (Wireless Fidelity, WiFi) module, a Bluetooth module, or a camera. Details are not described herein.

Figure 2:
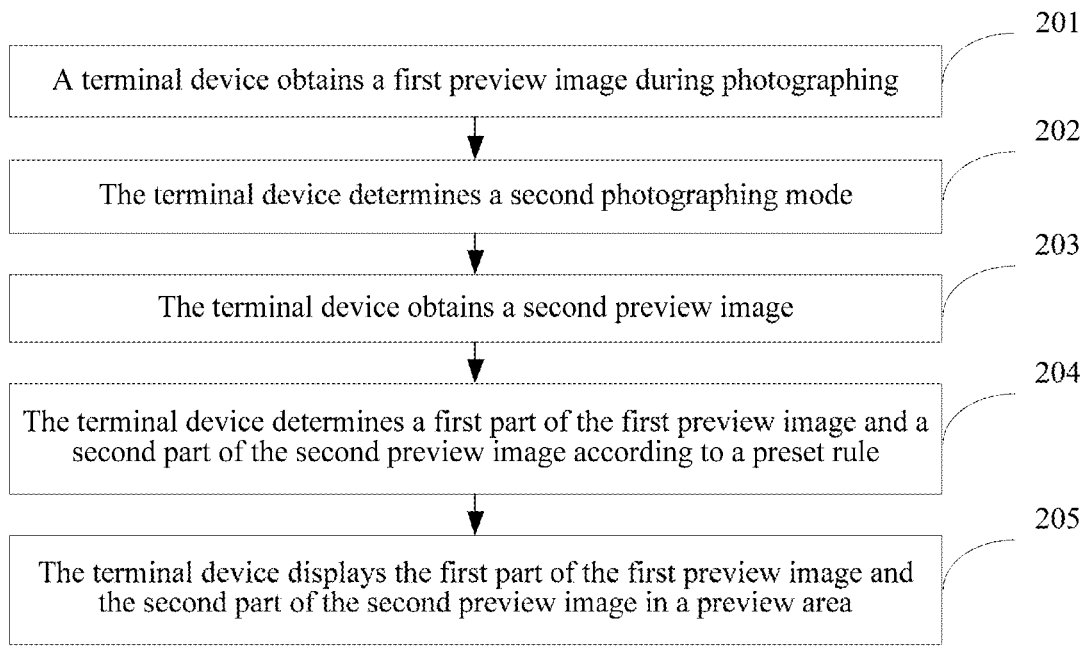
FIG. 2 is a flowchart of a preview-image display method according to an embodiment of the present invention.

FIG. 2 is a flowchart of a preview-image display method according to an embodiment of the present invention. As shown in FIG. 2, the method may include the following steps.

201. A terminal device obtains a first preview image during photographing.

The first preview image is a preview image that is of a current photographing screen and that is in a first photographing mode. The first photographing mode may be a preset mode, an artwork master mode, a mode used for last photographing, a mode having a highest use frequency, or an adaptive mode (which is, for example, a night mode).

When needing to use the terminal device to take pictures, a user may turn on a photographing function of the terminal device. In this way, the terminal device can display a photographing interface, where the photographing interface includes a preview area, used to display a preview image. When needing to do shooting, the user may direct a camera of the terminal device toward a photographed object. In this case, the terminal device can collect the current photographing screen including the photographed object by using the camera. When the first photographing mode is an artwork master mode, the collected current photographing screen is the first preview image. When the first photographing mode is not an artwork master mode, the terminal device may process the collected current photographing screen based on the first photographing mode, to obtain the first preview image.

202. The terminal device determines a second photographing mode.

The second photographing mode is any one of a plurality of photographing modes supported by the terminal device.

203. The terminal device obtains a second preview image.

The second preview image is a preview image that is of the current photographing screen and that is in the second photographing mode. After determining the second photographing mode, the terminal device can process the current photographing screen based on the second photographing mode, to obtain the second preview image.

204. The terminal device determines a first part of the first preview image and a second part of the second preview image according to a preset rule.

The terminal device can determine the first part of the first preview image and the second part of the second preview image in the following three manners.

In a first manner, a relationship between the first part of the first preview image and the second part of the second preview image that need to be displayed may be predefined. For example, the first part of the first preview image and the second part of the second preview image constitute the current photographing screen, or the first part of the first preview image and the second part of the second preview image have same corresponding content, or content included in the first part of the first preview image is not the same as content included in the second part of the second preview image. In this way, the terminal device may determine the first part of the first preview image and the second part of the second preview image based on the predefined relationship between the first part of the first preview image and the second part of the second preview image that need to be displayed.

In a second manner, the terminal device may determine a first area based on preset first resolution, and determine a second area based on preset second resolution; and determine a part that corresponds to the first preview image in the first area as the first part of the first preview image and a part that corresponds to the second preview image in the second area as the second part of the second preview image.

In a third manner, the terminal device may determine, based on a display position of a division line (where the division line divides the preview area into a first area and a second area) in the preview area, a part that corresponds to the first preview image in the first area as the first part of the first preview image and a part that corresponds to the second preview image in the second area as the second part of the second preview image.

It should be noted that herein, a manner of determining the first part of the first preview image and the second part of the second preview image is not specifically limited in this embodiment of the present invention.

205. The terminal device displays the first part of the first preview image and the second part of the second preview image in the preview area.

According to the preview-image display method provided in this embodiment of the present invention, after obtaining the first preview image and the second preview image, the terminal device may determine the first part of the first preview image and the second part of the second preview image according to the preset rule, and display the determined first part of the first preview image and the determined second part of the second preview image in the preview area. In this way, the terminal device divides the preview area into two parts, to respectively display a part of the preview image that is of the current photographing screen and that is in the first photographing mode and a part of the preview image that is of the current photographing screen and that is in the second photographing mode. Therefore, even though a size of a preview image displayed on the terminal device is small, the user can clearly discern differences between preview images that are of the current photographing screen and that are in different photographing modes, and even though the terminal device cannot simultaneously display the preview images that are of the current photographing screen and that are in the different photographing modes, the user can easily perceive the differences between the preview images that are of the current photographing screen and that are in the different photographing modes, thereby providing convenience for the user when the user views the differences between the preview images that are of the current photographing screen and that are in the different photographing modes.

Figure 3:
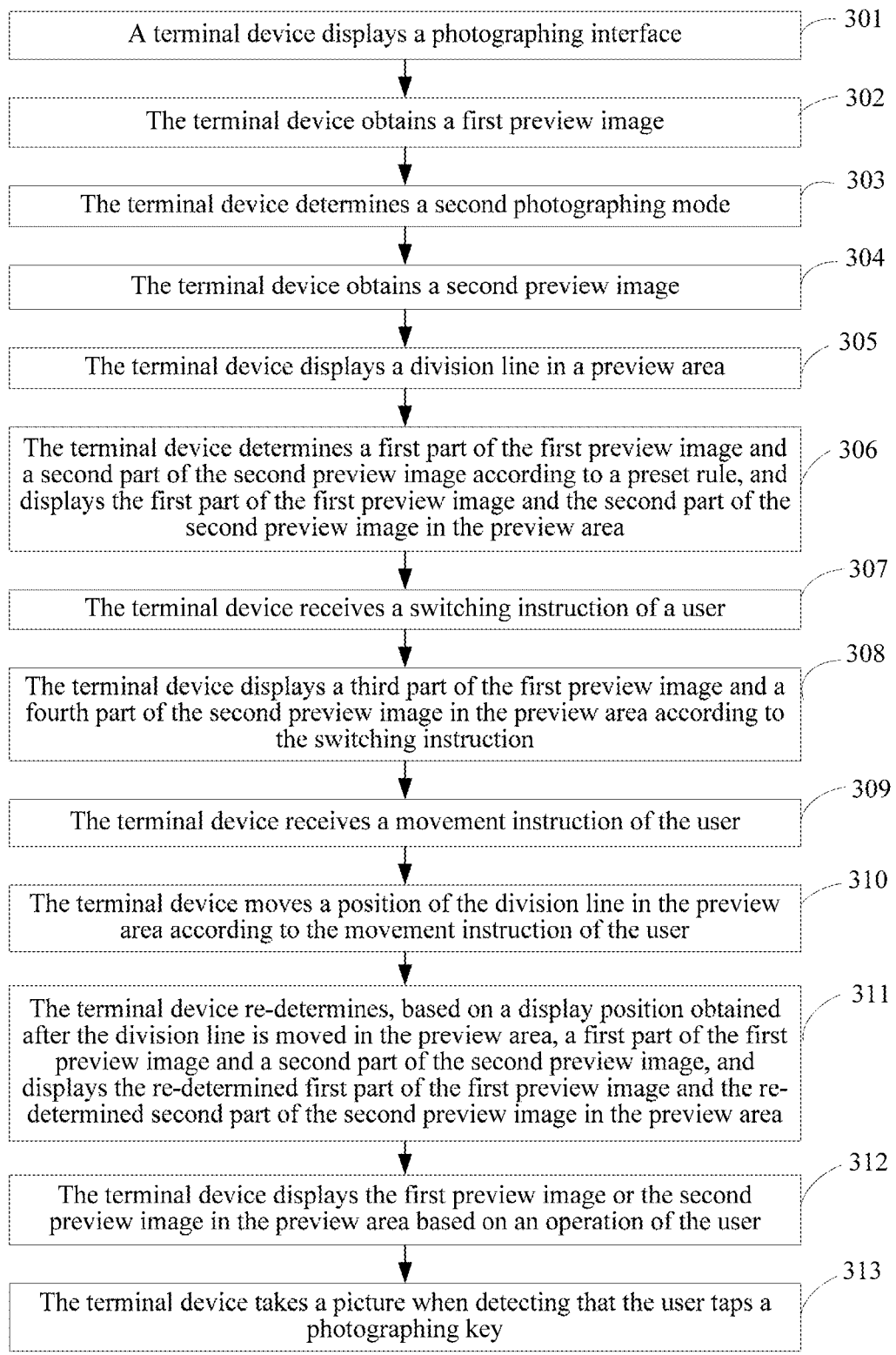
FIG. 3 is a flowchart of another preview-image display method according to an embodiment of the present invention.

FIG. 3 is a flowchart of another preview-image display method according to an embodiment of the present invention. As shown in FIG. 3, the method may include the following steps.

For ease of understanding, in this embodiment of the present invention, the preview-image display method is specifically described by using an example in which a terminal device determines a first part of a first preview image and a second part of a second preview image in the third manner in step 204 according to the foregoing embodiment of the present invention. In addition, a trigger operation in this embodiment of the present invention may be a touch & hold, a press, a knuckle tap, a double knuckle tap, or the like.

301. The terminal device displays a photographing interface.

Figure 4:
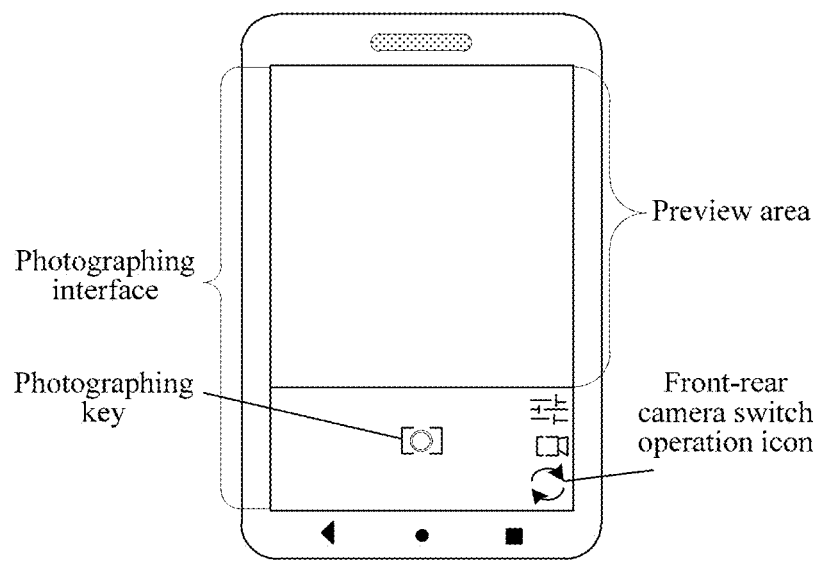
FIG. 4 is a schematic scenario diagram of a preview-image display method according to an embodiment of the present invention.

When a user needs to use the terminal device to take pictures, the user may turn on a photographing function of the terminal device. In this way, the terminal device can display a photographing interface, where the photographing interface includes a preview area, used to display a preview image. For example, it is assumed that the terminal device is a mobile phone. When the user taps a photographing application icon displayed on a touchscreen of the mobile phone, the mobile phone can display the photographing interface. As shown in FIG. 4, the photographing interface displayed on the mobile phone includes a preview area, a photographing key, a front-rear camera switch operation icon, and the like.

302. The terminal device obtains a first preview image.

After the terminal device displays the photographing interface, the user can direct a camera toward a photographed object. In this case, the terminal device can obtain the first preview image. The first preview image is a preview image that is of a current photographing screen and that is in a first photographing mode.

During specific implementation, the first photographing mode may be a preset mode, an artwork master mode, a mode used for last photographing, a mode having a highest use frequency, or an adaptive mode (where for example, the adaptive mode is a night mode). The preset mode, the mode used for last photographing, the mode having a highest use frequency, or the adaptive mode is included in a plurality of photographing modes supported by the terminal device. For example, it is assumed that the first photographing mode is the mode having a highest use frequency, and in a plurality of photographing modes such as a food mode, a portrait mode, a scene mode that are supported by the terminal device, the portrait mode has a highest use frequency. In this case, the first photographing mode is the portrait mode. The photographing mode supported by the terminal device may be used to determine a processing parameter for processing the current photographing screen. The processing parameter may include at least one of the following: white balance, exposure, a depth of field, saturation, contrast, brightness, a halo, sharpening, fuzzy processing, vignetting, an overall tone, and a color temperature. For example, if the terminal device is a digital camera, the digital camera may set, based on a photographing mode, a processing parameter for picture taking, for example, set values of white balance, exposure, and a depth of field. If the terminal device is a mobile phone, the mobile phone may determine, based on a photographing mode, a processing parameter for processing a current photographing screen using software, for example, determine values of saturation, contrast, brightness, a halo, sharpening, fuzzy processing, vignetting, and an overall tone.

For example, it is assumed that the first photographing mode is a mode used for last photographing, and the mode used for last photographing is a scene mode. In addition, it is assumed that the terminal device is a mobile phone. In this case, after the user directs the mobile phone toward a photographed object, the mobile phone may collect a current photographing screen by using a camera, determine, based on the scene mode, a processing parameter used for processing the current photographing screen using software, and then process the current photographing screen based on the determined processing parameter, to obtain the first preview image.

303. The terminal device determines a second photographing mode.

After displaying the photographing interface, the terminal device can determine the second photographing mode. In this embodiment of the present invention, the terminal device may determine the second photographing mode by using the following three implementations.

In a first implementation, the terminal device determines the second photographing mode based on a trigger operation performed by the user on prompt information.

When the user directs a camera of the terminal device toward the photographed object, the terminal device may determine the photographed object in content included in the current photographing screen, and determine a type of the photographed object. For example, when the current photographing screen includes a complete or incomplete face structure, or includes a body shape of a character, the terminal device may determine that the photographed object is a character, and determine that the type is a character. When the current photographing screen includes natural scenery but includes no person, or when the current photographing screen includes a character but a proportion of the character in the preview area is extremely small, the terminal device may determine that the photographed object is natural scenery, and determine that the type is a scene. When content included in the current photographing screen is mainly food, the terminal device may determine that the photographed object is food, and determine that the type is food.

In addition, the terminal device may determine, in the plurality of photographing modes supported by the terminal device, a photographing mode corresponding to the type as a candidate photographing mode. After determining the candidate photographing mode, the terminal device may display the prompt information, where the prompt information is used to prompt the user whether to agree on photographing in the candidate photographing mode, so that when the user performs the trigger operation on the prompt information within a preset time period, the terminal device determines the second photographing mode based on the trigger operation performed by the user on the prompt information. Specifically, when the user performs a confirmation trigger operation on the prompt information within the preset time, the terminal device may generate a selection confirmation instruction (where the selection confirmation instruction is used to determine the candidate photographing mode as the second photographing mode) based on the confirmation trigger operation performed by the user on the prompt information, and determine the candidate photographing mode as the second photographing mode based on the selection confirmation instruction. When the user performs a selection trigger operation on the prompt information within the preset time, the terminal device may generate a first selection instruction (where the first selection instruction is used to display a selection list) based on the selection trigger operation performed by the user on the prompt information, and display the selection list according to the first selection instruction, where the selection list includes a photographing mode that is in the plurality of photographing modes supported by the terminal device and that is different from the candidate photographing mode. When the user performs a selection operation on a photographing mode in the selection list, the terminal device may generate a second selection instruction (where the second selection instruction is used to determine the second photographing mode in the selection list) based on the selection operation performed by the user, and determine, as the second photographing mode according to the second selection instruction, the photographing mode selected by the user. When the user performs no trigger operation on the prompt information within the preset time period, the terminal device may hide the prompt information, and display, in the preview area, a preview image that is of the current photographing screen and that is in the first photographing mode, namely, the first preview image, so that the user takes a picture in the first photographing mode.

It should be noted that, in this embodiment of the present invention, when the user performs different trigger operations on the prompt information, the terminal device may generate different instructions based on the different trigger operations, and make different responses according to the different instructions. In addition, a correspondence between the trigger operations and the instructions and a correspondence between the instructions and the responses may be preset in the terminal device. A specific correspondence between a trigger operation and an instruction and a specific correspondence between an instruction and a response are not limited in this embodiment of the present invention. For example, it is assumed that the following correspondences are preset in the terminal device: a correspondence between a double knuckle tap (that is, the confirmation trigger operation is the double knuckle tap) and the selection confirmation instruction, a correspondence between the selection confirmation instruction and determining a candidate photographing mode as the second photographing mode, a correspondence between a knuckle tap (that is, the selection trigger operation is the knuckle tap) and the first selection instruction, and a correspondence between the first selection instruction and displaying the selection list. In this way, when the user performs a double knuckle tap on the prompt information, the terminal device may first generate the selection confirmation instruction, and then use the candidate photographing mode as the second photographing mode according to the selection confirmation instruction. When the user performs a knuckle tap on the prompt information, the terminal device may first generate the first selection instruction, and then display the selection list according to the first selection instruction.

For example, during specific implementation, the prompt information may be displayed in a form of a reminder popup box. For example, the reminder popup box may be displayed in a form of toast. In addition, the terminal device may display the reminder popup box in a corresponding position based on preset position information of the reminder popup box. For example, the position information may indicate a position slightly lower than a middle center of the preview area, a position slightly upper than a middle center of the preview area, or a position slightly lower than a middle center of an area that displays a second part of the second preview image and that is in the preview area, so that the user learns, based on a position of the reminder popup box, that the second part is a part that is of the second preview image and that is in the second photographing mode.

Figure 5:
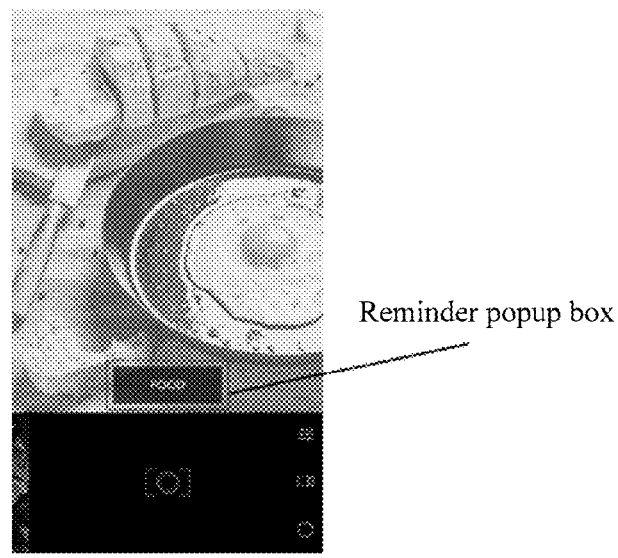
FIG. 5 is a schematic scenario diagram of another preview-image display method applied to an embodiment of the present invention according to an embodiment of the present invention.

For example, it is assumed that the user directs the camera of the terminal device to an egg, the terminal device may determine, in the current photographing screen, that the photographed object is an egg, determine that a type of the egg is food, and determine, based on that the type is food, that the candidate photographing mode is a food mode. In this case, as shown in FIG. 5, the terminal device displays the reminder popup box in a form of toast, displays FOOD in the reminder popup box to indicate that the candidate photographing mode is a food mode, and displays the reminder popup box in a position slightly lower than a middle center of the preview area based on the position information. In addition, it is assumed that the confirmation trigger operation is a knuckle tap, and the selection trigger operation is a press. When the user performs a knuckle tap on the reminder popup box within the preset time period, the terminal device may generate the selection confirmation instruction, and determines the food mode as the second photographing mode based on the selection confirmation instruction. When the user presses the reminder popup box within the preset time period, the terminal device may generate the first selection instruction, and displays the selection list based on the first selection instruction. The selection list includes a photographing mode that is different from the food mode and that in the plurality of photographing modes supported by the terminal device, such as a portrait mode and a scene mode. When the user selects the scene mode from the selection list, the terminal device generates the second selection instruction, and determines the scene mode as the second photographing mode based on the second selection instruction. When the user performs no trigger operation on the reminder popup box within the preset time period, the terminal device may hide the reminder popup box.

In a second implementation, the terminal device determines, as the second photographing mode, a photographing mode selected by the user.

The terminal device may display at least one photographing mode on the photographing interface. When needing to view a preview image that is of the current photographing screen and that is in a photographing mode, the user may select the photographing mode from the at least one photographing mode. In this case, the terminal device may generate a mode selection instruction based on a selection operation performed by the user, where the mode selection instruction is used to determine the second photographing mode from the at least one photographing mode, and determine, as the second photographing mode based on the mode selection instruction, the photographing mode selected by the user.

In a third implementation, the terminal device determines the second photographing mode based on a type of the photographed object.

After the user directs a camera of the terminal device toward the photographed object, the terminal device may determine the photographed object in the current photographing screen, determine the type of the photographed object based on content included in the photographed object, and determine, in the plurality of photographing modes supported by the terminal device, a photographing mode corresponding to the type as the second photographing mode. In the third implementation, a specific implementation process of determining the type of the photographed object is similar to the specific implementation process of determining the type of the photographed object in the first implementation, and details are not described herein again in this embodiment of the present invention.

It should be noted that in this embodiment of the present invention, step 302 and step 303 may be performed in any sequence. To be specific, after step 301 is performed, step 302 may be first performed and step 303 may be then performed, or step 303 may be first performed and step 302 may be then performed. An execution sequence of step 302 and step 303 is not specifically limited in this embodiment of the present invention.

304. The terminal device obtains a second preview image.

The second preview image is a preview image that is of the current photographing screen and that is in the second photographing mode. After determining the second photographing mode, the terminal device may first determine, based on the second photographing mode, the processing parameter for processing the current photographing screen, and then process the current photographing screen based on the determined processing parameter, to obtain the second preview image.

For example, it is assumed that the terminal device is a mobile phone, and the second photographing mode is a food mode. In this case, the mobile phone may process the current photographing screen by using the following content determined based on the food mode: saturation being a flesh color, sharpening being detail sharpening, an overall tone being a warm color, and vignetting being vignetting at four edges, to obtain the second preview image.

305. The terminal device displays a division line in the preview area.

The division line divides the preview area into a first area and a second area. After the terminal device displays the photographing interface, when the user needs to view a difference between the preview images that are of the current photographing screen and that are in the first photographing mode and the second photographing mode, the terminal device may display the division line in the preview area, to respectively display, in the first area and the second area in the preview area, the preview image that is of the current photographing screen and that is in the first photographing mode and the preview image that is of the current photographing screen and that is in the second photographing mode, that is, respectively display a first part of the first preview image and the second part of the second preview image.

It should be noted that the division line displayed on the terminal device may be an open line such as a vertical line, a horizontal line, an arc line, a zigzag line, a broken line, or a wavy line, or may be an enclosed line of any form such as a circle or a triangle. A specific form of the division line is not limited in this embodiment of the present invention.

Figure 6:
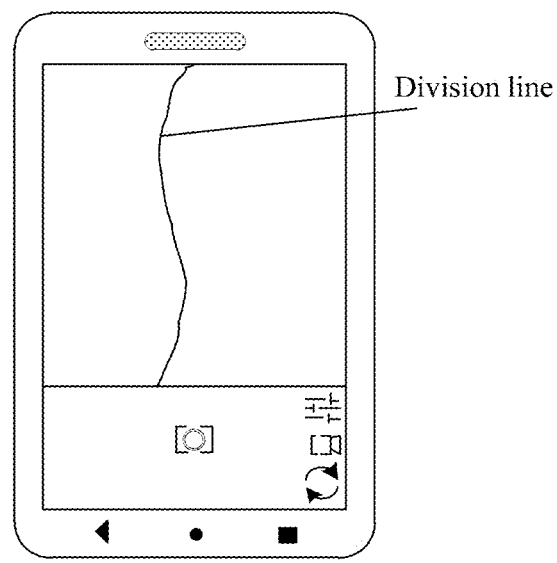
FIG. 6 is a schematic scenario diagram of another preview-image display method applied to an embodiment of the present invention according to an embodiment of the present invention.
Figure 7:
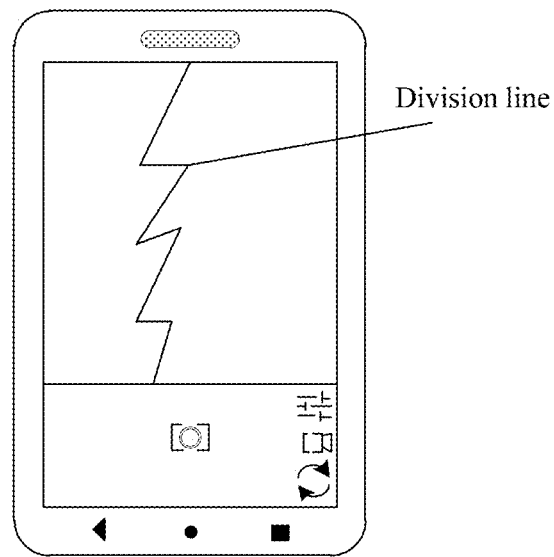
FIG. 7 is a schematic scenario diagram of another preview-image display method applied to an embodiment of the present invention according to an embodiment of the present invention.

For example, it is assumed that the terminal device is a mobile phone. FIG. 6 shows that a division line displayed on the mobile phone is a wavy line, and FIG. 7 shows that a division line displayed on the mobile phone is a zigzag line.

Figure 8:
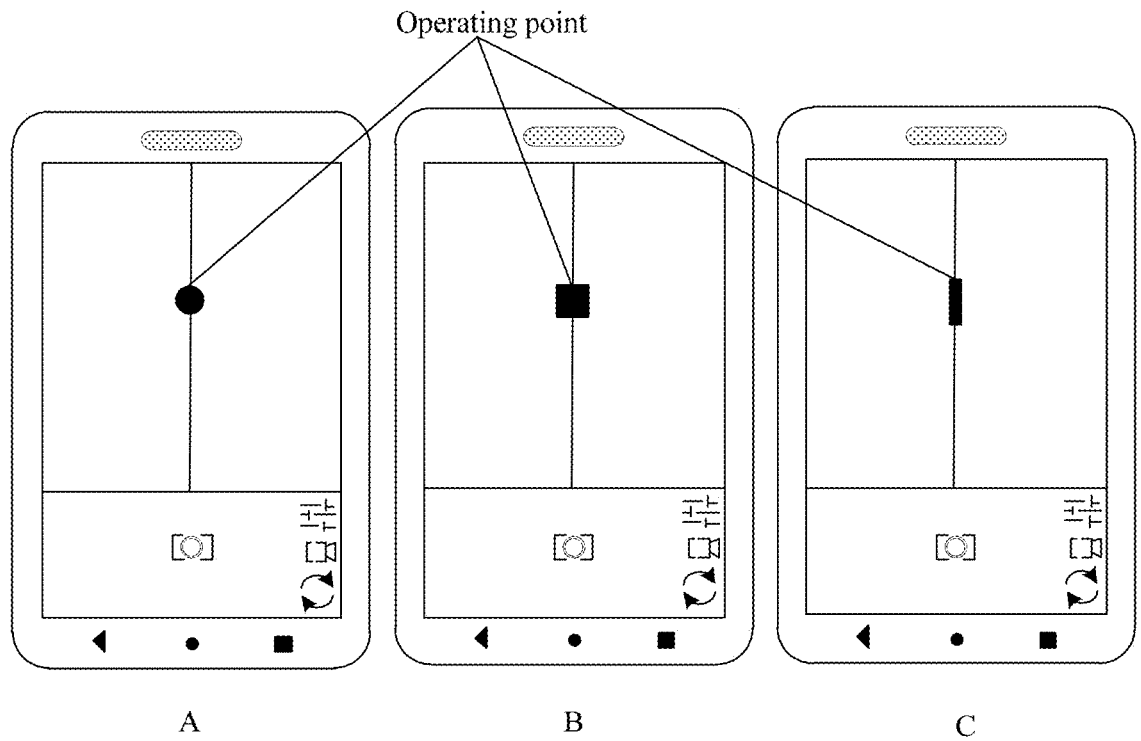
FIG. 8 is a schematic scenario diagram of another preview-image display method applied to an embodiment of the present invention according to an embodiment of the present invention.

Further, the division line displayed on the terminal device may include an operation point, so that the user can implement an operation on the division line by operating the operation point, where a shape of the operation point may be a circle, a square, a rectangle, or the like. It should be noted that, a specific form of the operation point is not limited in this embodiment of the present invention. The specific form of operation point that is used may be preconfigured in the terminal device, so that display the operation point based on the configuration. For example, a visual representation form of the operation point may be a drag handle. The drag handle indicates, to the user, that the drag handle is movable, so that the user moves the division line by moving the drag handle. For example, it is assumed that the division line is a vertical line. As shown by A in FIG. 8, an operation point displayed on the terminal device in a vertical is a circle, as shown by B in FIG. 8, an operation point displayed on the terminal device in a vertical line is a square, and as shown by C in FIG. 8, an operation point displayed on the terminal device in a vertical is a rectangle.

In this embodiment of the present invention, step 305 may be specifically performed by using the following three implementations.

In the first implementation, the terminal device displays the division line in the preview area based on a prestored parameter.

The parameter refers to position information of the division line. For example, the position information may be a center line in a vertical direction of the preview area, or a center line in a horizontal direction of the preview area.

In a second implementation, the terminal device displays the division line in the preview area based on a traced track.

The user may perform tracing in the preview area, so that the terminal device can generate a tracing instruction based on a tracing operation of the user, determine the traced track according to the tracing instruction, and display the division line in the preview area based on the traced track. Optionally, before the user performs tracing, the terminal device may display the first preview image or the second preview image in the preview area, so that the user can trace the division line based on content of the displayed preview image.

In a third implementation, the terminal device displays the division line based on a contour of each of at least one material object.

After directing toward the photographed object, the terminal device can directly intelligently display the division line based on a feature of content of the current photographing screen. During specific implementation, the terminal device may use an edge detection method to extract at least one material object included in the current photographing screen, determine a contour of each of the at least one material object, and display the division line based on the contour of each of the at least one material object.

A specific process in which the terminal device uses the edge detection method to determine the contour of each of the at least one material object is: First, the terminal device obtains luminance values of all pixels included in the current photographing screen, and uses an edge detection operator included in the edge detection method to process the luminance values of all the pixels included in the current photographing screen, to obtain processed luminance values of all the pixels included in the current photographing screen. Then, the terminal device may select, from all the pixels included in the current photographing screen, pixels whose processed luminance values are greater than a preset threshold, to obtain a first pixel set, and determine the contour of each of the at least one material object based on consecutive pixels in the first pixel set.

The edge detection method may include a plurality of edge detection operators, such as a Roberts (Roberts) operator, a Sobel (Sobel) operator, a Prewitt (Prewitt) operator, a Canny (Canny) operator, a Laplacian (Laplacian) operator, or a Marr (Man) operator. The Roberts operator features high precision and noise sensitivity. The Sobel operator features a smooth function for noise but low precision. The Canny operator features a good step-structure edge detection effect and strong anti-noise performance.

It should be noted that in this embodiment of the present invention, any one of the plurality of edge detection operators included in the edge detection method may be used to process the luminance values of the pixels included in the current photographing screen. A specifically used edge detection operator is not limited in this embodiment of the present invention, and the specifically used edge detection operator may be preconfigured in the terminal device.

In this embodiment of the present invention, that the terminal device uses the Laplacian operator is used as an example to describe processing, performed by the terminal device, of the luminance values of all the pixels included in the current photographing screen. The Laplacian operator may be represented by using a 3*3 template. All of nine coefficients in the template are filter coefficients used for image processing. When different templates are used, the terminal device processes, in different manners, the luminance values of all the pixels included in the current photographing interface, to obtain different processed luminance values of all the pixels included in the current photographing screen. However, when a relatively bright pixel exists in a relatively dark area on the current photographing screen, even though different templates are used to process the luminance values of all the pixels included in the current photographing screen, a larger processed luminance value of the relatively bright pixel is obtained. Therefore, the relatively bright pixel is brighter.

It should be noted that a specific form of the template is not limited in this embodiment of the present invention. The specific form of the template may be preconfigured in the terminal device, so that the terminal device can use the template to process the luminance values of all the pixels included in the current photographing screen.

For example, the Laplacian operator may be represented by using a template 1 shown in Table 1 or a template 2 shown in Table 2. In this embodiment of the present invention, the template 1 shown in Table 1 is used as an example for description.

TABLE 1

| 1 | 1  | 1 |
|---|----|---|
| 1 | -8 | 1 |
| 1 | 1  | 1 |

TABLE 2

| 0 | 1  | 0 |
|---|----|---|
| 1 | -4 | 1 |
| 0 | 1  | 0 |

During specific implementation, a process of obtaining, by the terminal device by using the template 1, processed luminance values of all the pixels included in the current photographing screen is: the terminal device convolves the template 1 with the luminance values of all the pixels included in the current photographing screen sequentially. Specifically, the terminal device may sequentially multiply nine coefficients in the template 1 by nine values in nine panels using a luminance value of a pixel as a center, and add up all products, to obtain a processed luminance value of the pixel. Based on this method, the terminal device can obtain the processed luminance values of all the pixels included in the current photographing screen.

For example, as shown in Table 3, A1 to E5 represent the luminance values of all the pixels included in the current photographing screen.

TABLE 3

| A1 | A2 | A3 | A4 | A5 |
|----|----|----|----|----|
| B1 | B2 | B3 | B4 | B5 |
| C1 | C2 | C3 | C4 | C5 |
| D1 | D2 | D3 | D4 | D5 |
| E1 | E2 | E3 | E4 | E5 |

After obtaining A1 to E5, the terminal device may convolve the template 1 with A1 to E5 sequentially. Specifically, the terminal device may multiply the nine coefficients in the template 1 by nine values in nine panels using any value of A1 to E5 as a center, and add up all products, to obtain a processed luminance value of the pixel. For example, a processed luminance value A1' of a pixel included in the current photographing screen may be obtained based on a formula $A1'=(-8)*A1+1*A2+1*B1+1*B2$, and a processed luminance value B2' of a pixel included in the current photographing screen may be obtained based on a formula $B2'=1*A1+1*A2+1*A3+1*B1-8*B2+1*B3+1*C1+1*C2+1*C3$. As shown in Table 4, A1' to E5' are the processed luminance values of all the pixels included in the current photographing screen.

TABLE 4

| A1' | A2' | A3' | A4' | A5' |
|-----|-----|-----|-----|-----|
| B1' | B2' | B3' | B4' | B5' |
| C1' | C2' | C3' | C4' | C5' |
| D1' | D2' | D3' | D4' | D5' |
| E1' | E2' | E3' | E4' | E5' |

In addition, in this embodiment of the present invention, the terminal device may display, in the following two manners, the division line based on the contour of each of the at least one material object.

First, the terminal device displays a division line between corresponding positions of different material objects based on the contour of each of the at least one material object.

Specifically, when the current photographing screen includes only one material object, the terminal device may calculate a tangent to a contour of the material object, and display the division line in a position corresponding to the tangent. When the current photographing screen includes two or more material objects, the terminal device may calculate a tangent 1 at a point on a contour of a first material object included in the current photographing screen, and display the division line in a position corresponding to the tangent 1. In this case, the position corresponding to the tangent 1 is between the first material object and another material object included in the current photographing screen. Further, after calculating the tangent 1 at the point on the contour of the first material object included in the current photographing screen, the terminal device may calculate a tangent 2 at a point on a contour of a second material object, where the tangent 2 and the tangent 1 intersect at a point. The terminal device may display the division line in a position corresponding to a broken line obtained through intersection by the tangent 2 and the tangent 1. In this case, the position corresponding to the broken line is between the first material object and the second material object. Further, after obtaining the broken line of the tangent 2 and the tangent 1, the terminal device may perform smoothing processing on the broken line to obtain an arc line, and display the division line in a position corresponding to the arc line. In this case, the position corresponding to the arc line is between the first material object and the second material object.

Figure 9:
FIG. 9 is a schematic scenario diagram of another preview-image display method applied to an embodiment of the present invention according to an embodiment of the present invention.
Figure 10:
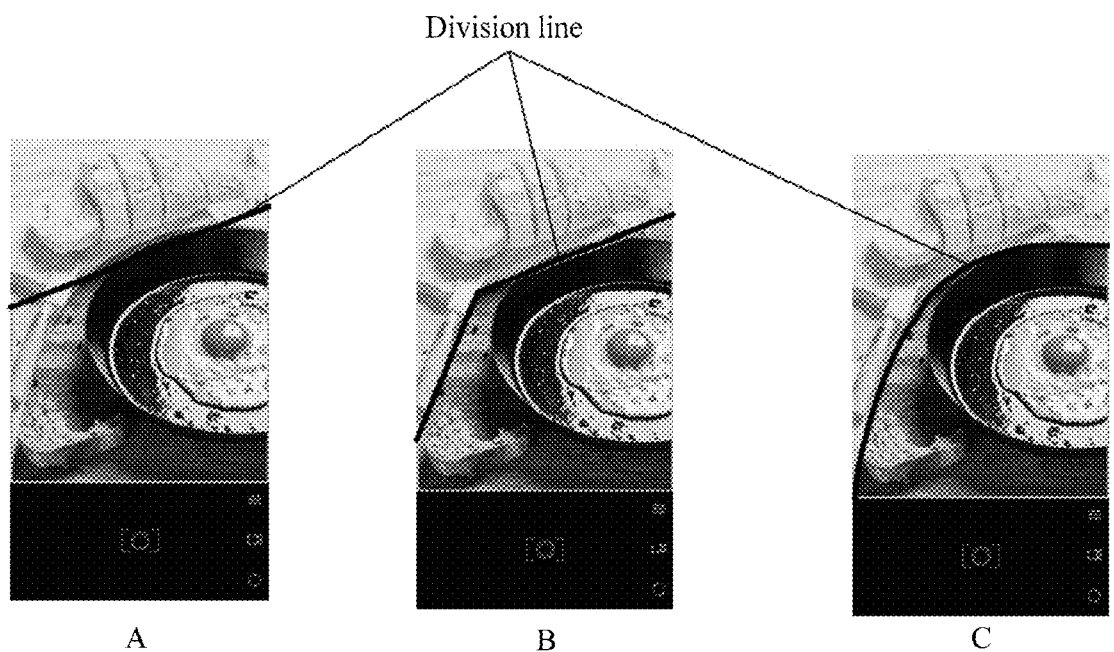
FIG. 10 is a schematic scenario diagram of another preview-image display method applied to an embodiment of the present invention according to an embodiment of the present invention.

For example, as shown in FIG. 9, it is assumed that the terminal device identifies that the current photographing screen includes a knife, a pot, a piece of bread, and an egg in the pot, and determines a contour of the knife, a contour of the pot, a contour of the bread, and a contour of the egg. As shown by A in FIG. 10, the terminal device calculates a tangent 1 at a point on the contour of the pot, and displays the division line in a position corresponding to the tangent 1. In this case, the position corresponding to the tangent 1 is among the pot, the knife, and the bread. As shown by B in FIG. 10, a tangent 2 calculated by the terminal device at a point on the contour of the knife intersects with the tangent 1 to obtain a broken line, and the terminal device displays the division line in a position corresponding to the broken line. In this case, the position corresponding to the broken line is between the pot and the knife. As shown by C in FIG. 10, the terminal device performs smoothing processing on the broken line shown by B in FIG. 10 to obtain an arc line, and displays the division line in a position corresponding to the arc line. In this case, the position corresponding to the arc line is between the pot and the knife.

Second, the terminal device displays a division line at a position corresponding to a contour of any one of the at least one material object.

The terminal device may directly display the division line in the position corresponding to a contour of any one of the at least one material object included in the current photographing screen. Further, the terminal device may determine a rectangular area based on a boundary of a periphery of the contour of the material object, determine a circle by using a center of the rectangular area as a circle center and using half a length of a shorter side of the rectangular area as a radius, and display the division line in a position corresponding to the circle.

Figure 11:
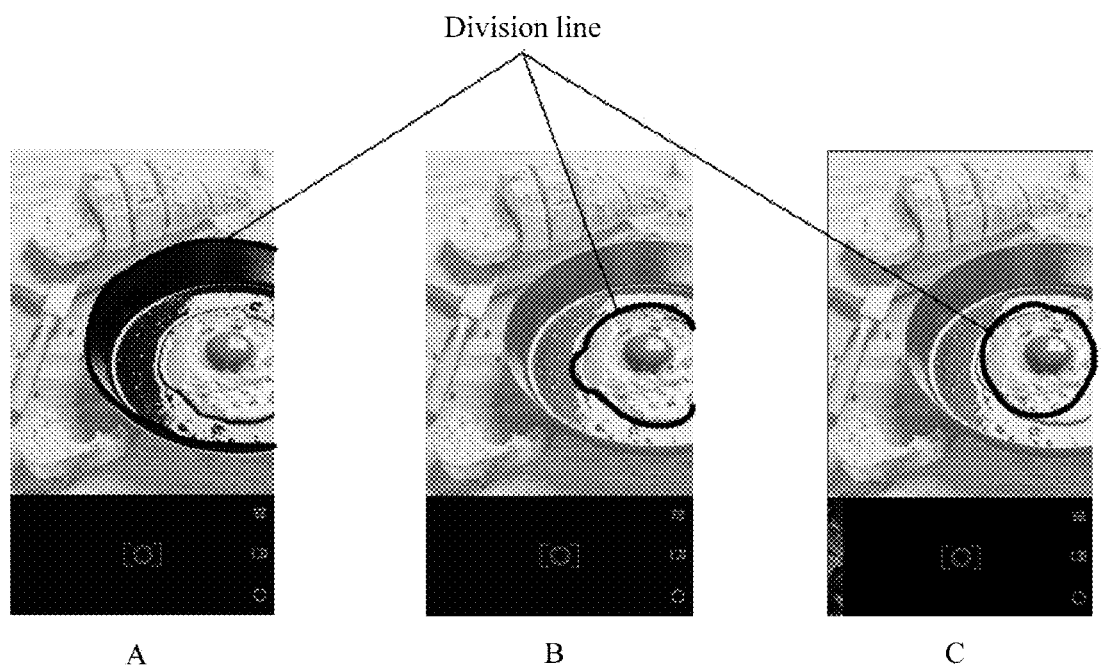
FIG. 11 is a schematic scenario diagram of another preview-image display method applied to an embodiment of the present invention according to an embodiment of the present invention.

For example, according to the contour of the knife, the contour of the pot, the contour of the bread, and the contour of the egg that are determined by the terminal device in FIG. 9, as shown by A in FIG. 11, the terminal device directly displays the division line in the position corresponding to the contour of the pot; as shown by B in FIG. 11, the terminal device directly displays the division line in the position corresponding to the contour of the egg; and as shown by C in FIG. 11, the terminal device determines a circle based on the contour of the egg, and displays the division line in a position corresponding to the circle.

It should be noted that in this embodiment of the present invention, step 302 to step 304 and step 305 may be performed in any sequence. To be specific, after step 301 is performed, step 302 to step 304 may be first performed and step 305 may be then performed, or step 305 may be first performed and step 302 to step 304 may be then performed. An execution sequence of step 302 to step 304 and step 305 is not specifically limited in this embodiment of the present invention.

306. The terminal device determines the first part of the first preview image and the second part of the second preview image according to a preset rule, and displays the first part of the first preview image and the second part of the second preview image in the preview area.

The terminal device may determine, based on a display position of the division line in the preview area, a part that corresponds to the first preview image in the first area as the first part of the first preview image and a part that corresponds to the second preview image in the second area as the second part of the second preview image, and display the first part of the first preview image and the second part of the second preview image in the preview area. In this way, the user can view, in the preview area of the terminal device, both the preview images that are of the current photographing screen and that are in the first photographing mode and the second photographing mode, and clearly discern differences between the preview images that are of the current photographing screen and that are in the first photographing mode and the second photographing mode in terms of exposure, a tone, and the like.

It should be noted that, the division line in step 305 and the first part of the first preview image and the second part of the second preview image in step 306 are displayed in any sequence. A display sequence of the division line and the first part of the first preview image and the second part of the second preview image is not limited in this embodiment of the present invention. In this embodiment of the present invention, that the division line and the first part of the first preview image and the second part of the second preview image are simultaneously displayed is used as an example for description.

During specific implementation, a first rule and a second rule may be preset in the terminal device based on a shape of the division line, so that the terminal device can determine, based on the first rule, all pixels in the first preview image that satisfy a condition (where all the pixels in the first preview image that satisfy the condition constitute the first part of the first preview image), and determine, based on the second rule, all pixels in the second preview image that satisfy a condition (where all the pixels in the second preview image that satisfy the condition constitute the second part of the second preview image). Specifically, the terminal device may use a left corner of the preview image as an origin to obtain coordinates of all pixels included in the first preview image and the second preview image. Because the preview area is used to display a preview image, that is, the preview area and the preview image are the same in size, the terminal device may use a left corner of the preview area as an origin to determine coordinates of all pixels included in the division line. The terminal device may use coordinates of each pixel on the division line as a boundary, to select a coordinate set conforming to the first rule from coordinates of all pixels included in the first preview image, and determine, as the first part of the first preview image, pixels that are in the first preview image and that correspond to all coordinates included in the coordinate set. The terminal device may further select a coordinate set conforming to the second rule from coordinates of all pixels included in the second preview image, and determine, as the second part of the second preview image, pixels that are in the second preview image and that correspond to all coordinates included in the coordinate set.

Figure 12:
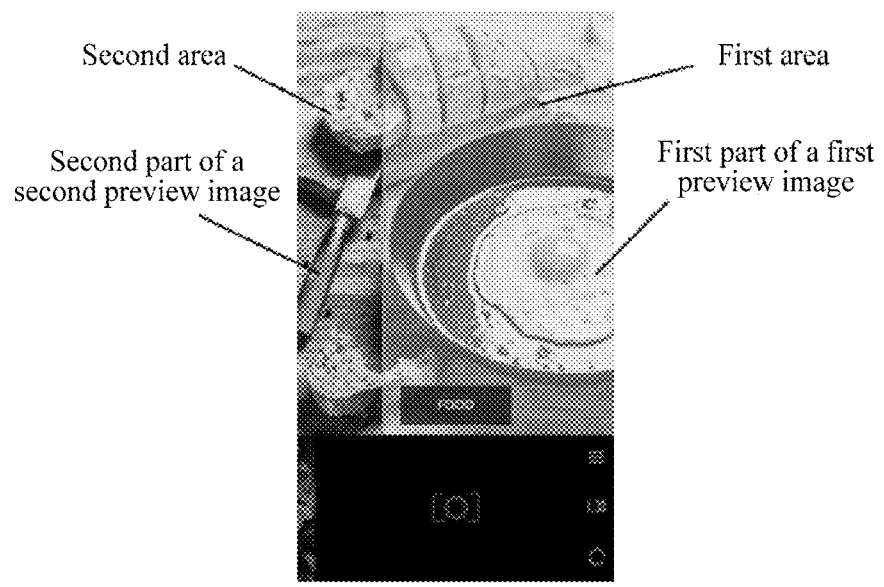
FIG. 12 is a schematic scenario diagram of another preview-image display method applied to an embodiment of the present invention according to an embodiment of the present invention.

For example, the division line is a vertical line. In this case, the first rule is: when ordinates in the coordinates of the pixels included in the first preview image and ordinates in the coordinates of the pixels on the division line are the same, determining a pixel whose abscissa in coordinates is greater than an abscissa in coordinates of a corresponding pixel on the division line as a pixel included in the first part of the first preview image. The second rule is: when ordinates in the coordinates of the pixels included in the second preview image and ordinates in the coordinates of the pixels on the division line are the same, determining a pixel whose abscissa in coordinates is less than an abscissa in coordinates of a corresponding pixel on the division line as a pixel included in the second part of the second preview image. For example, it is assumed that coordinates of a pixel on the vertical line are (9, 0). In this case, the terminal device may select, based on the first rule and from the coordinates of all the pixels included in the first preview image, coordinates including an ordinate of 0, to obtain a first coordinate set; select, from the first coordinate set, coordinates including an abscissa greater than 9, to obtain a second coordinate set; and determine, based on each pair of coordinates included in the second coordinate set, a pixel that is in the first preview image and that corresponds to each pair of coordinates as a pixel included in the first part of the first preview image. In this way, the terminal device can determine, based on the first rule, all pixels in the first preview image that satisfy a condition. The terminal device may select, based on the second rule and from the coordinates of all the pixels included in the second preview image, coordinates including an ordinate of 0, to obtain a third coordinate set; select, from the third coordinate set, coordinates including an abscissa less than 9, to obtain a fourth coordinate set; and determine, based on each pair of coordinates included in the fourth coordinate set, a pixel that is in the second preview image and that corresponds to each pair of coordinates as a pixel included in the second part of the second preview image. In this way, the terminal device can determine, based on the second rule, all pixels in the second preview image that satisfy a condition. The terminal device displays all the determined pixels in the first preview image that satisfy the condition and all the determined pixels in the second preview image that satisfy the condition. FIG. 12 shows the first part of the first preview image and the second part of the second preview image that are displayed on the mobile phone.

Figure 13:
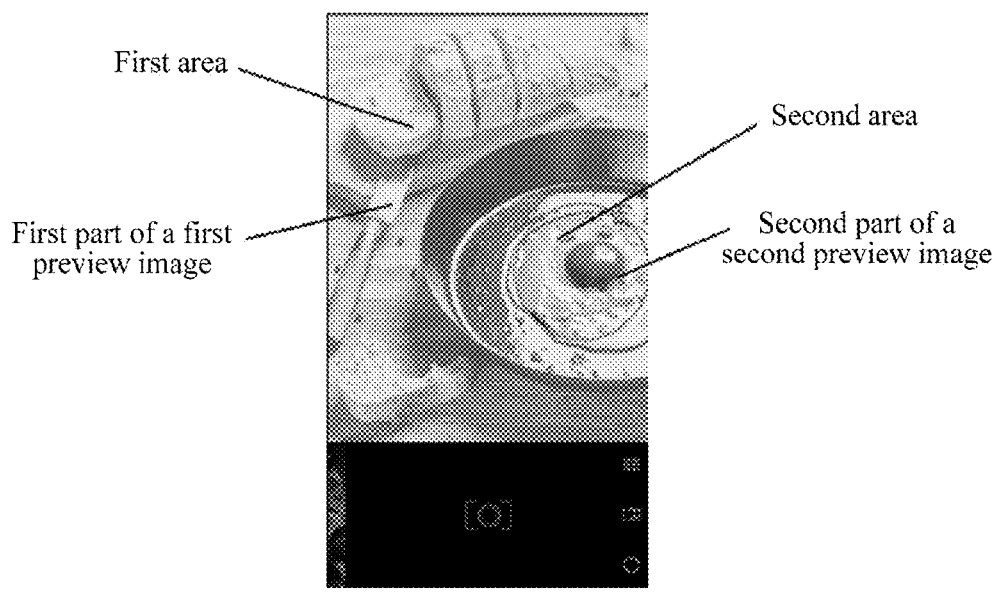
FIG. 13 is a schematic scenario diagram of another preview-image display method applied to an embodiment of the present invention according to an embodiment of the present invention.

For example, the division line is a circle. In this case, the first rule is: when an ordinate in coordinates of a pixel included in the first preview image is less than an ordinate of an upper vertex of the circle or greater than an ordinate of a lower vertex of the circle, determining the pixel as a pixel included in the first part of the first preview image; when an ordinate in coordinates of a pixel included in the first preview image is equal to an ordinate of the upper vertex of the circle, determining a pixel whose abscissa in coordinates is not equal to an abscissa of the upper vertex of the circle as a pixel included in the first part of the first preview image; when an ordinate in coordinates of a pixel included in the first preview image is equal to an ordinate of the lower vertex of the circle, determining a pixel whose abscissa in coordinates is not equal to an abscissa of the lower vertex of the circle as a pixel included in the first part of the first preview image; and when an ordinate in coordinates of a pixel included in the first preview image is equal to ordinates in any two pairs of coordinates in the circle, determining a pixel whose abscissa in coordinates is less than a smaller abscissa or greater than a larger abscissa in the two pairs of coordinates as a pixel included in the first part of the first preview image. The second rule is: when an ordinate in coordinates of a pixel included in the second preview image is equal to ordinates in any two pairs of coordinates in the circle, determining a pixel whose abscissa in coordinates is greater than a smaller abscissa and less than a larger abscissa in the two pairs of coordinates as a pixel included in the second part of the second preview image. For example, it is assumed that coordinates of a pixel at the upper vertex of the circle are (6, 4), and coordinates of a pixel at the lower vertex of the circle are (6, 14). In this case, the terminal device may obtain, based on the first rule, coordinates including ordinates less than 4 or greater than 14 of pixels in the first preview image, and determine the pixels that correspond to the coordinates and that are in the first preview image as pixels included in the first part of the first preview image. In addition, it is assumed that coordinates of two pixels that are located on a same horizontal line and that are of the circle are (1, 9) and (11, 9). In this case, the terminal device may further select, based on the first rule and from the coordinates of all the pixels included in the first preview image, coordinates including an ordinate of 9, to obtain a first coordinate set; select, from the first coordinate set, coordinates including an abscissas less than 1 or greater than 11, to obtain a second coordinate set; and determine, based on each pair of coordinates included in the second coordinate set, a pixel that is in the first preview image and that corresponds to each pair of coordinates as a pixel included in the first part of the first preview image. In this way, the terminal device can determine, based on the first rule, all pixels in the first preview image that satisfy a condition. The terminal device may select, based on the second rule and from the coordinates of all the pixels included in the second preview image, coordinates including an ordinate of 9, to obtain a third coordinate set; select, from the third coordinate set, coordinates including an abscissa greater than 1 and less than 11, to obtain a fourth coordinate set; and determine, based on each pair of coordinates included in the fourth coordinate set, a pixel that is in the second preview image and that corresponds to each pair of coordinates as a pixel included in the second part of the second preview image. In this way, the terminal device can determine, based on the second rule, all pixels in the second preview image that satisfy a condition. The terminal device displays all the determined pixels in the first preview image that satisfy the condition and all the determined pixels in the second preview image that satisfy the condition. FIG. 13 shows the first part of the first preview image and the second part of the second preview image that are displayed on the mobile phone.

It should be noted that, in this embodiment of the present invention, that the terminal device displays, in the preview area, preview images that are of the current photographing screen and that are in two photographing modes (where the two photographing modes are the first photographing mode and the second photographing mode) is used as an example for description. Certainly, the terminal device may alternatively display, in the preview area, preview images that are of the current photographing screen and that are in three or more photographing modes. A quantity of photographing modes in which preview images of the current photographing screen are displayed by the terminal device is not specifically limited in this embodiment of the present invention.

In addition, after completing step 301 to step 306, the terminal device has completed the displaying of the preview images. Further, to enable the user to better view differences between preview images that are of the current photographing screen and that are in different photographing modes, after the terminal device displays the division line, the first part of the first preview image, and the second part of the second preview image, the user may perform an operation to switch content displayed in the first area and the second area, to change sizes of the first part of the first preview image and the second part of the second preview image, to view a complete preview image, and so on.

In a scenario, when the user needs to switch the content displayed in the first area and the second area, the preview-image display method provided in this embodiment of the present invention may further include step 307 and step 308.

307. The terminal device receives a switching instruction of the user.

The switching instruction is used to switch content displayed in the first area and the second area. When needing to switch the content displayed in the first area and the second area, the user may perform a trigger operation in the preview area. The terminal device may generate a switching instruction based on the trigger operation of the user.

308. The terminal device displays a third part of the first preview image and a fourth part of the second preview image in the preview area according to the switching instruction.

The third part of the first preview image and the first part of the first preview image constitute the complete first preview image, and the fourth part of the second preview image and the second part of the second preview image constitute the complete second preview image.

During specific implementation, the terminal device may select, according to the generated switching instruction, a coordinate set conforming to the second rule from the coordinates of all the pixels included in the first preview image, and determine and display the third part of the first preview image based on the coordinate set. The terminal device may further select, according to the generated switching instruction, a coordinate set conforming to the first rule from the coordinates of all the pixels included in the second preview image, and determine and display the fourth part of the second preview image based on the coordinate set. For specific implementation of determining, by the terminal device, the third part of the first preview image and the fourth part of the second preview image, refer to the descriptions in step 306, and details are not described herein again.

Figure 14:
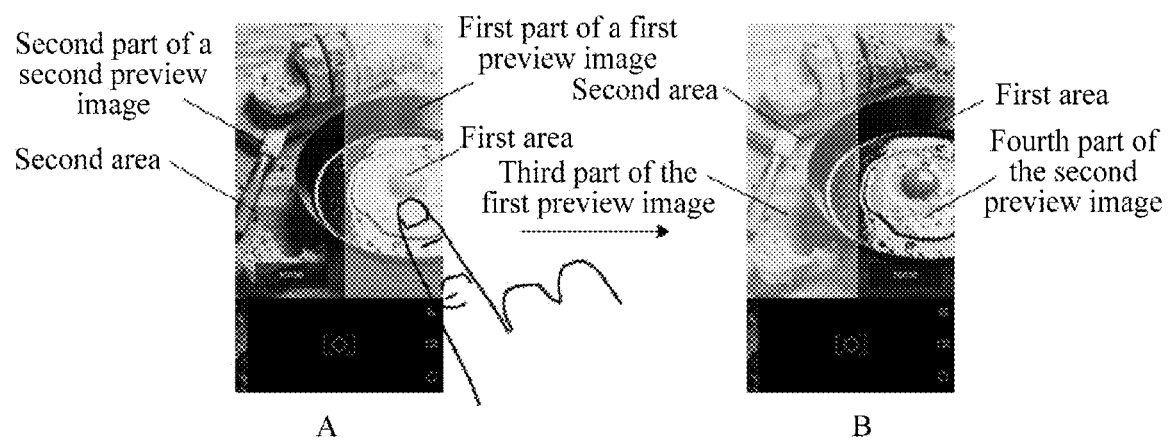
FIG. 14 is a schematic scenario diagram of another preview-image display method applied to an embodiment of the present invention according to an embodiment of the present invention.

For example, it is assumed that the trigger operation is a touch & hold. As shown by A in FIG. 14, the terminal device displays the second part of the second preview image in the second area and displays the first part of the first preview image in the first area. The user performs a touch & hold operation in the preview area, where a time period of the touch and hold operation in the preview area reaches a preset threshold. As shown by B in FIG. 14, the terminal device displays the third part of the first preview image in the second area, and displays the fourth part of the second preview image in the first area.

In another scenario, when the user needs to change sizes of the first part of the first preview image and the second part of the second preview image, the preview-image display method provided in this embodiment of the present invention may further include step 309 to step 311.

309. The terminal device receives a movement instruction of the user.

The movement instruction is used to move a division line.

310. The terminal device moves the position of the division line in the preview area according to the movement instruction of the user.

When needing to move the position of the division line in the preview area, the user may touch any position on the division line. The terminal device may generate a movement instruction based on a touch operation of the user, and move the position of the division line in the preview area according to the movement instruction of the user. For example, when the user touches any position on the division line, the terminal device may obtain position information of a touch point (where the position information of the touch point corresponds to the position touched by the user). When the user moves the touch point toward a direction, the terminal device may obtain position information of a changed touch point in real time, generate a movement instruction based on the position information of the changed touch point, and correspondingly move the position of the division line in the preview area according to the movement instruction.

Further, if the division line includes an operation point, when needing to move the position of the division line in the preview area, the user may touch a position corresponding to the operation point, so that the terminal device generates a movement instruction based on a touch operation of the user, and moves the position of the division line in the preview area according to the movement instruction.

311. The terminal device re-determines, based on a display position obtained after the division line is moved in the preview area, a first part of the first preview image and a second part of the second preview image, and displays the re-determined first part of the first preview image and the re-determined second part of the second preview image in the preview area.

After moving the position of the division line in the preview area according to the movement instruction, the terminal device may re-determine the first part of the first preview image and the second part of the second preview image based on the display position obtained after the division line is moved in the preview area, and display the re-determined first part of the first preview image and the re-determined second part of the second preview image in the preview area, so that the user can view differences between preview images that are of the current photographing screen and that are in the first photographing mode and the second photographing mode in real time. During specific implementation, the terminal device may re-determine the first part of the first preview image and the second part of the second preview image based on the method for determining the first part of the first preview image and the second part of the second preview image in step 306.

It should be noted that, in an implementation of this embodiment of the present invention, the terminal device may re-determine and display the first part of the first preview image and the second part of the second preview image only when detecting that the user stops moving the division line. That is, during a process of moving the division line by the terminal device, the first part of the first preview image and the second part of the second preview image do not change.

In another implementation of this embodiment of the present invention, the terminal device may re-determine and display the first part of the first preview image and the second part of the second preview image in real time based on a moved position of the division line in the preview area. That is, during a process of moving the division line by the terminal device, the first part of the first preview image and the second part of the second preview image change in real time. Specifically, the terminal device may periodically obtain the moved position of the division line in the preview area, and re-determine and display the first part of the first preview image and the second part of the second preview image based on the moved position of the division line in the preview area.

Figure 15:
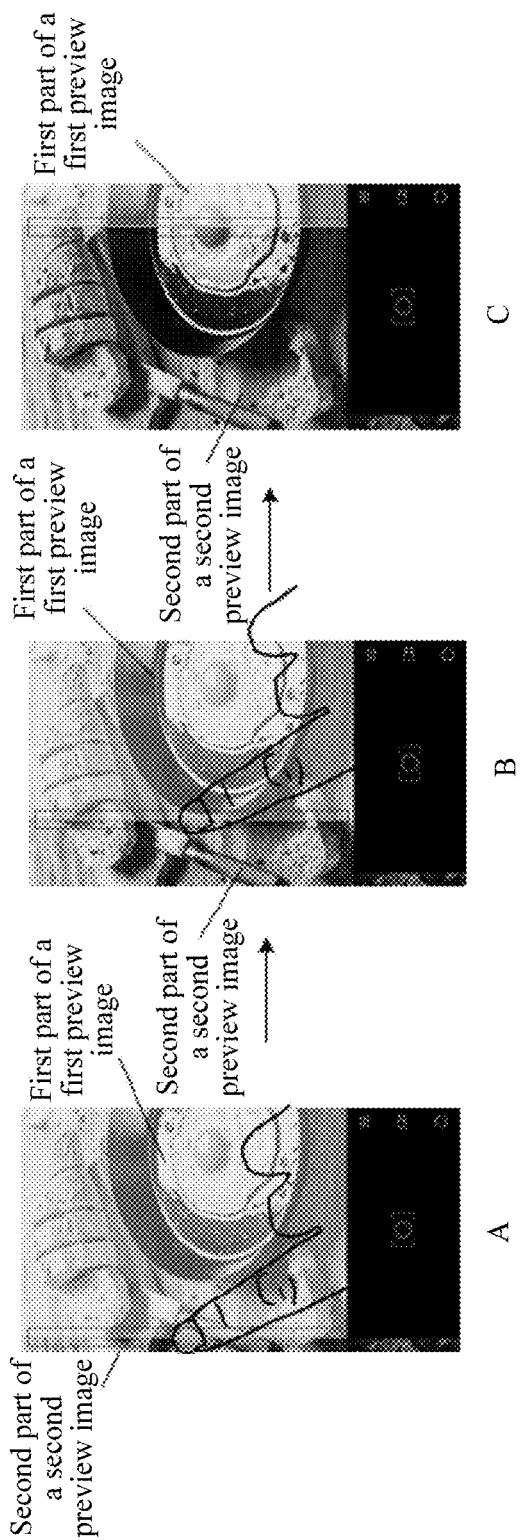
FIG. 15 is a schematic scenario diagram of another preview-image display method applied to an embodiment of the present invention according to an embodiment of the present invention.

For example, as shown by A in FIG. 15, assuming that the user touches a position corresponding to the operation point on the division line, the terminal device may obtain position information of a touch point. When the user moves the touch point toward a direction, the terminal device may obtain position information of a changed touch point in real time, generate a movement instruction based on the position information of the changed touch point, and correspondingly move the position of the division line in the preview area according to the movement instruction. As shown by B in FIG. 15, the terminal device re-determines, based on a display position obtained after the division line is moved in the preview area, a first part of the first preview image and a second part of the second preview image, and displays the re-determined first part of the first preview image and the re-determined second part of the second preview image in the preview area. As shown by C in FIG. 15, the terminal device re-determines, based on a display position obtained after the division line is moved in the preview area, a first part of the first preview image and a second part of the second preview image again, and displays the re-determined first part of the first preview image and the re-determined second part of the second preview image in the preview area.

Figure 16:
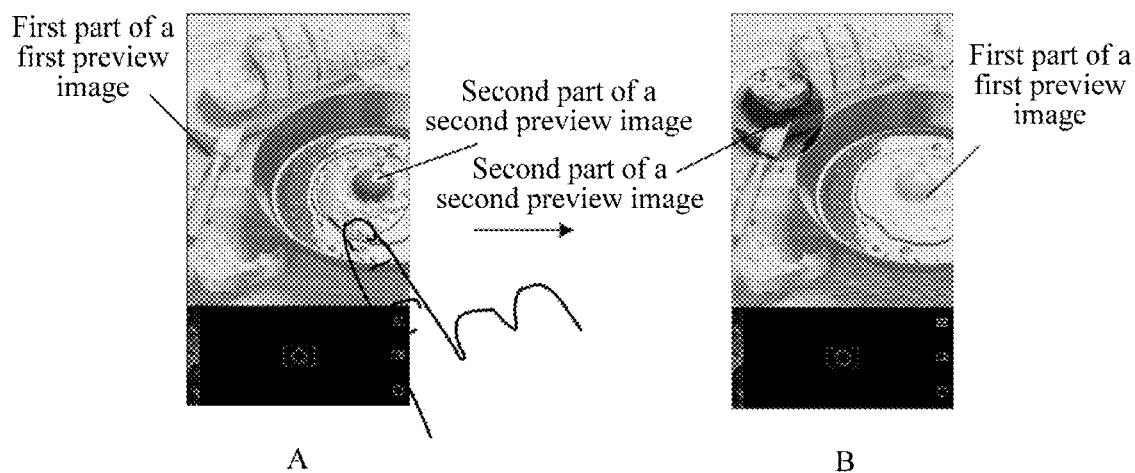
FIG. 16 is a schematic scenario diagram of another preview-image display method applied to an embodiment of the present invention according to an embodiment of the present invention.

For another example, as shown by A in FIG. 16, assuming that the user touches any position on a circle, the terminal device may obtain position information of a touch point. When the user moves the touch point toward a direction, the terminal device may obtain position information of a changed touch point in real time, generate a movement instruction based on the position information of the changed touch point, and correspondingly move the position of the circle in the preview area according to the movement instruction. As shown by B in FIG. 16, the terminal device re-determines, based on a display position obtained after the circle is moved in the preview area, a first part of the first preview image and a second part of the second preview image, and displays the re-determined first part of the first preview image and the re-determined second part of the second preview image in the preview area.

In another scenario, after the user views the differences between the preview images that are of the current photographing screen and that are in the different photographing modes, when the user needs to view a complete preview image, the preview-image display method provided in this embodiment of the present invention may further include step 312.

312. The terminal device displays the first preview image or the second preview image in the preview area based on an operation of the user.

In this embodiment of the present invention, the terminal device may display the first preview image or the second preview image in the preview area in the following three manners.

In a first manner, the terminal device displays the first preview image or the second preview image in the preview area when detecting that the user moves the division line out of the preview area.

During specific implementation, it may be preset in the terminal device that a corresponding preview image is displayed when the division line is moved out of the preview area in a different direction. For example, it is assumed that the division line is a vertical line. When the user moves the division line leftward and moves the division line out of the preview area, the terminal device displays the first preview image. When the user moves the division line rightward and moves the division line out of the preview area, the terminal device displays the second preview image. Further, in this embodiment of the present invention, after viewing the differences between the preview images that are of the current photographing screen and that are in the first photographing mode and the second photographing mode, the user may move the division line out of the preview area in different directions, to indicate whether to use the second photographing mode to take pictures.

Figure 17:
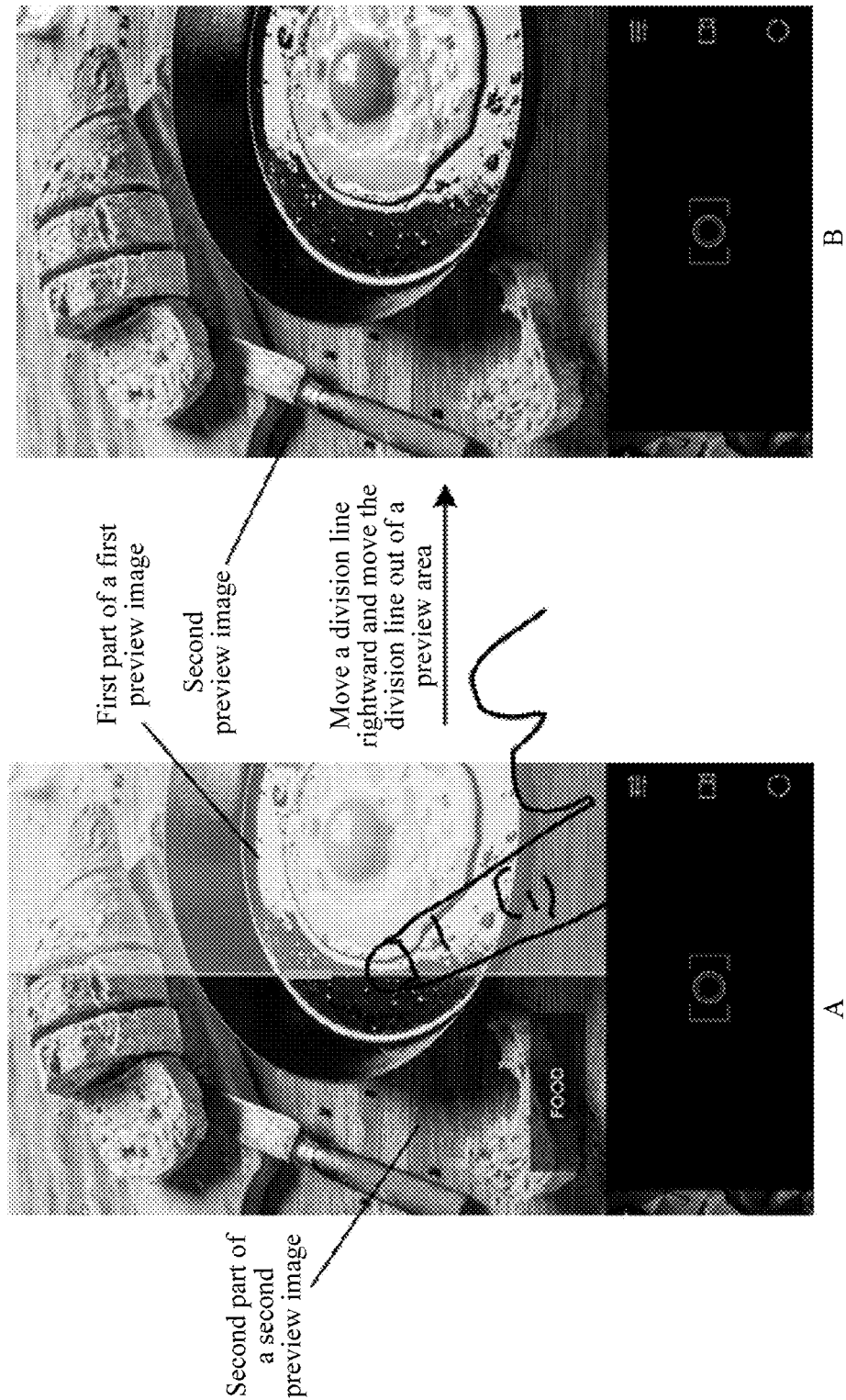
FIG. 17 is a schematic scenario diagram of another preview-image display method applied to an embodiment of the present invention according to an embodiment of the present invention.
Figure 18:
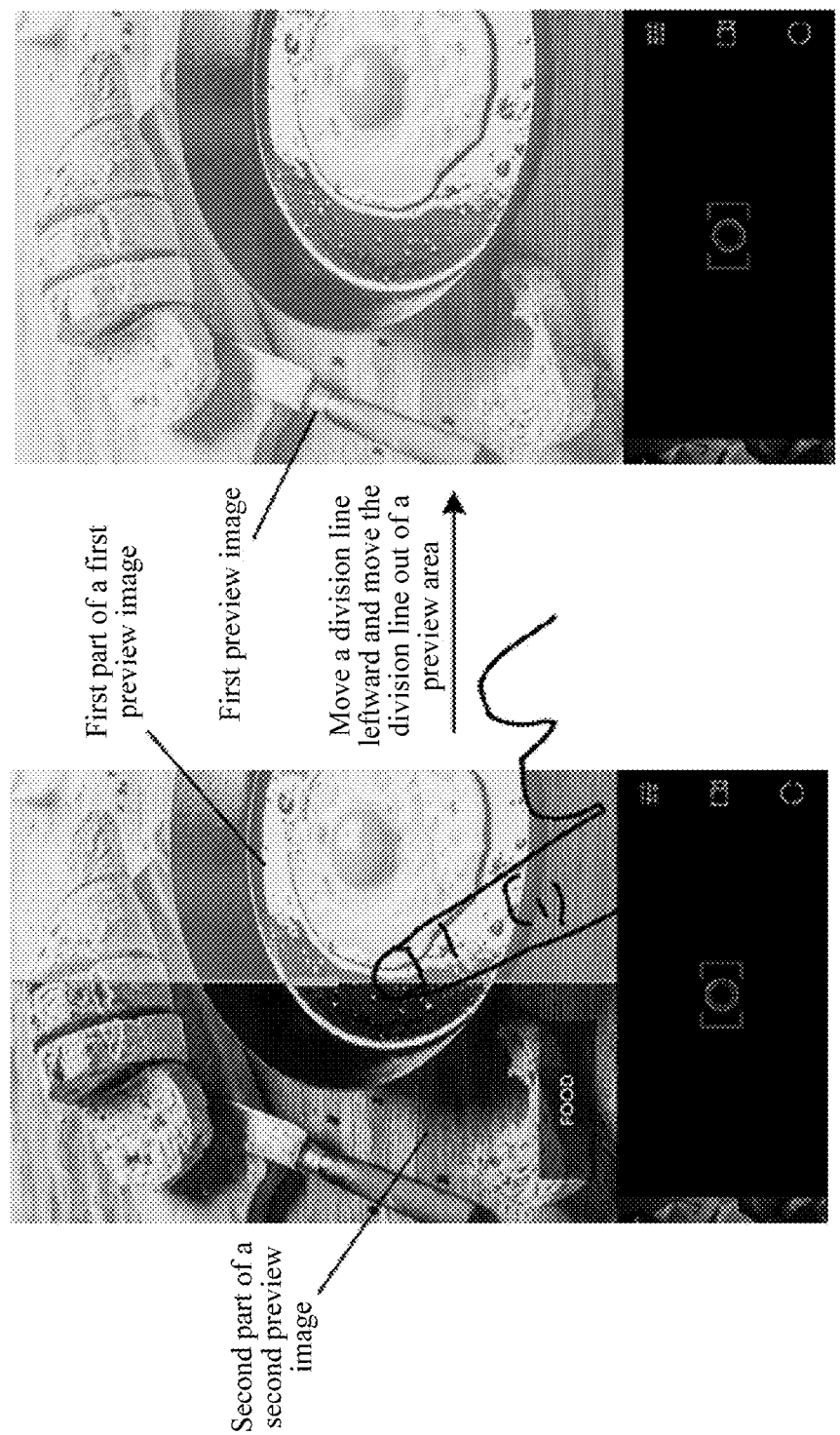
FIG. 18 is a schematic scenario diagram of another preview-image display method applied to an embodiment of the present invention according to an embodiment of the present invention.

For example, as shown by A in FIG. 17, it is assumed that the user touches a display position of an operation point on the vertical line, and moves the division line rightward to move the division line out of the preview area. As shown by B in FIG. 17, the terminal device displays the second preview image, to indicate that the user uses the second photographing mode to take pictures. As shown by A in FIG. 18, it is assumed that the user touches a display position of an operation point on the vertical line, and moves the division line leftward to move the division line out of the preview area. As shown by B in FIG. 18, the terminal device displays the first preview image, to indicate that the user does not use the second photographing mode to take pictures.

In a second manner, the terminal device displays the first preview image or the second preview image in the preview area based on a trigger operation of the user on the division line.

When the user performs the trigger operation on the division line, the terminal device may generate a selection trigger instruction based on the trigger operation performed by the user on the division line, and display the first preview image or the second preview image in the preview area according to the selection trigger instruction. The selection trigger instruction is used to display the first preview image or the second preview image.

During specific implementation, when the user performs different trigger operations on the division line, the terminal device generates different instructions based on the trigger operations performed by the user, and displays different preview images according to the instructions. For a specific trigger operation based on which a specific instruction is generated and a specific instruction according to which a specific preview image is displayed may be preset in the terminal device or be prompted to the user through notification information. For example, it is assumed that when the user touches and holds the division line, the terminal device may generate a first selection trigger instruction based on the touch & hold operation, and display the first preview image according to the first selection trigger instruction, and when the user performs a double knuckle tap on the division line, the terminal device may generate a second selection trigger instruction based on the double knuckle tap, and display the second preview image according to the second selection trigger instruction.

In a third manner, the terminal device displays a full-screen identifier in the preview area, and displays the first preview image or the second preview image in the preview area when detecting a trigger operation of the user on the full-screen identifier.

The terminal device may display the full-screen identifier in the preview area. When the user performs the trigger operation on the full-screen identifier, the terminal device may generate a full-screen confirmation instruction based on the trigger operation performed by the user on the full-screen identifier, and display the first preview image or the second preview image in the preview area according to the full-screen confirmation instruction, where the full-screen confirmation instruction is used to display the first preview image or the second preview image.

During specific implementation, the full-screen confirmation instruction is specifically used to display a preview image that may be preset in the terminal device, so that after the user performs the trigger operation on the full-screen identifier, the terminal device may display a corresponding preview image in the preview area. In addition, when the user performs a trigger operation on any position other than that of the full-screen identifier, the terminal device may display a corresponding preview image in the preview area, where the preview image is different from the preview image displayed on the terminal device when the user performs the trigger operation on the full-screen identifier.

Figure 19:
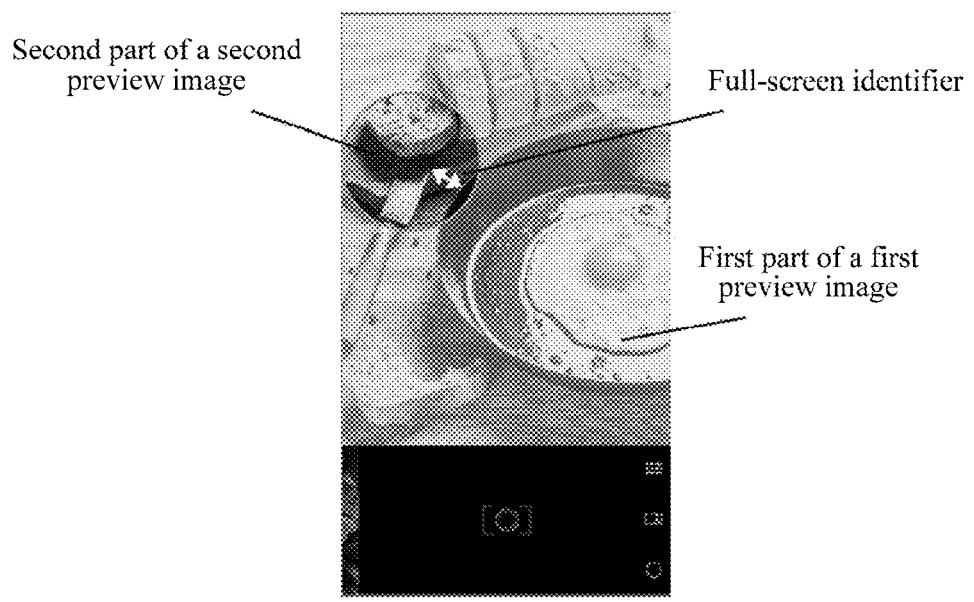
FIG. 19 is a schematic scenario diagram of another preview-image display method applied to an embodiment of the present invention according to an embodiment of the present invention.

For example, FIG. 19 shows a full-screen identifier displayed in a circle of the terminal device. It is assumed that the full-screen confirmation instruction being used to display the second preview image is preset in the terminal device. In this way, when the user performs the trigger operation on the full-screen identifier, the terminal device may display the second preview image. When the user performs the trigger operation on any position out of the circle, the terminal device may display the first preview image in the preview area.

313. The terminal device takes a picture when detecting that the user taps a photographing key.

It should be noted that, in this embodiment of the present invention, the terminal device may display, in the preview area, preview images that are of the current photographing screen and that are in different photographing modes before the user taps a photographing key. Certainly, the terminal device may alternatively display, in the preview area, preview images that are of the current photographing screen and that are in different photographing modes after the user taps a photographing key, so that the user views differences between the preview images that are of the current photographing screen and that are in the different photographing modes.

According to the preview-image display method provided in this embodiment of the present invention, after obtaining the first preview image and the second preview image, the terminal device may determine the first part of the first preview image and the second part of the second preview image according to the preset rules, and display the determined first part of the first preview image and the determined second part of the second preview image in the preview area. In this way, the terminal device divides the preview area into two parts, to respectively display a part of the preview image that is of the current photographing screen and that is in the first photographing mode and a part of the preview image that is of the current photographing screen and that is in the second photographing mode. Therefore, even though a size of a preview image displayed on the terminal device is small, a user can clearly discern differences between preview images that are of the current photographing screen and that are in different photographing modes, and even though the terminal device cannot simultaneously display the preview images that are of the current photographing screen and that are in the different photographing modes, the user can easily perceive the differences between the preview images that are of the current photographing screen and that are in the different photographing modes, thereby providing convenience for the user when the user views the differences between the preview images that are of the current photographing screen and that are in the different photographing modes.

The foregoing describes the solutions provided in the embodiments of the present invention mainly from the perspective of the terminal device. It may be understood that, to implement the foregoing functions, the terminal device includes a corresponding hardware structure and/or a software module that executes each function. A person of ordinary skill in the art should easily be aware that, in combination with the examples described in the algorithms steps of the embodiments disclosed in this specification, the invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In this embodiment of the present invention, functional modules of the terminal device may be divided based on the foregoing method examples. For example, each functional module may be divided according to each function, or two or more functions may be integrated into one processing module. The integrated module may be implemented in a form of hardware, or may be implemented in a form of a software functional module. It should be noted that, in this embodiment of the present invention, module division is exemplary, and is merely a logical function division. In actual implementations, another division manner may be used.

Figure 20:
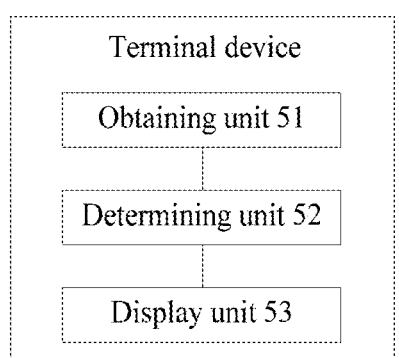
FIG. 20 is a schematic composition diagram of another terminal device according to an embodiment of the present invention.

When various functional modules are divided corresponding to various functions, FIG. 20 is a possible schematic composition diagram of the terminal device in the foregoing embodiments. As shown in FIG. 20, the terminal device may include an obtaining unit 51, a determining unit 52, and a display unit 53.

The obtaining unit 51 is configured to support the terminal device in performing step 201 and step 203 in the preview-image display method shown in FIG. 2 and step 302 and step 304 in the preview-image display method shown in FIG. 3.

The determining unit 52 is configured to support the terminal device in performing step 202 and step 204 in the preview-image display method shown in FIG. 2, and step 303, step 306 of determining the first part of the first preview image and the second part of the second preview image according to a preset rule, and step 311 of re-determining a first part of the first preview image and a second part of the second preview image that are in the preview-image display method shown in FIG. 3.

The display unit 53 is configured to support the terminal device in performing step 205 in the preview-image display method shown in FIG. 2, and step 301, step 305, step 306 of displaying the first part of the first preview image and the second part of the second preview image, step 308, step 311 of displaying the re-determined first part of the first preview image and the re-determined second part of the second preview image, and step 312 that are in the preview-image display method shown in FIG. 3.

Figure 21:
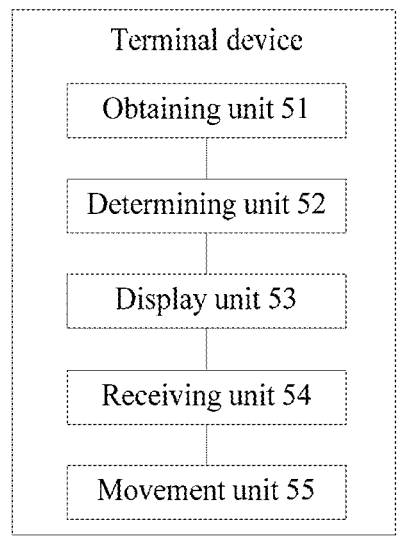
FIG. 21 is a schematic composition diagram of another terminal device according to an embodiment of the present invention.

In this embodiment of the present invention, further, as shown in FIG. 21, the terminal device may further include a receiving unit 54 and a movement unit 55.

The receiving unit 54 is configured to support the terminal device in performing step 307 and step 309 in the preview-image display method shown in FIG. 3.

The movement unit 55 is configured to support the terminal device in performing step 310 in the preview-image display method shown in FIG. 3.

It should be noted that, all related content of each step in the foregoing method embodiments may be cited in function descriptions of a corresponding functional module. Details are not described herein again.

The terminal device provided in this embodiment of the present invention is configured to perform the foregoing preview-image display method, and therefore, can achieve a same effect as the foregoing preview-image display method.

Figure 22:
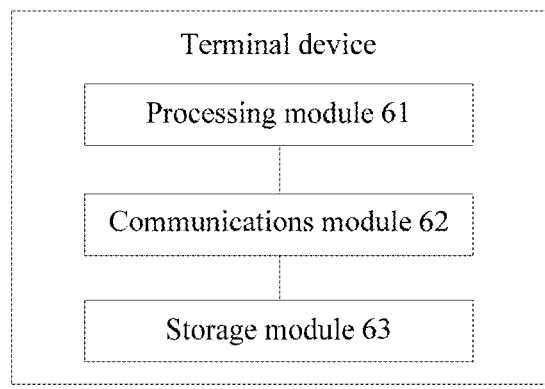
FIG. 22 is a schematic composition diagram of another terminal device according to an embodiment of the present invention.

When an integrated unit is used, FIG. 22 is another possible schematic composition diagram of the terminal device used in the foregoing embodiments. As shown in FIG. 22, the terminal device includes a processing module 61 and a communications module 62.

The processing module 61 is configured to control and manage an action of the terminal device. For example, the processing module 61 is configured to support the terminal device in performing step 201, step 202, step 203, step 204, and step 205 in FIG. 2, step 301, step 302, step 303, step 304, step 305, step 306, step 307, step 308, step 309, step 310, step 311, step 312, and step 313 in FIG. 3, and/or another process in a technology described in this specification. The communications module 62 is configured to support communication between the terminal device and another network entity. The terminal device may further include a storage module 63, configured to store program code and data of the terminal device.

The processing module 61 may be a processor or a controller. The processor/controller may implement or execute various example logical blocks, modules, and circuits described with reference to content disclosed in the present invention. The processor may also be a combination that implements a calculation function, for example, including one microprocessor or a combination of a plurality of microprocessors, or a combination of a Digital Signal Processor (DSP) and a microprocessor. The communications module 62 may be a transceiver, a transceiver circuit, a communications interface, or the like. The storage module 63 may be a memory.

The foregoing descriptions about implementations allow a person skilled in the art to clearly understand that, for the purpose of convenient and brief description, division of the foregoing function modules is taken as an example for illustration. In actual applications, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A preview-image display method, comprising:
    obtaining, by a terminal device, a first preview image and a second preview image, wherein the first preview image is based on a current picture in a first mode and the second preview image is based on the current picture in a second mode; and
    displaying, by the terminal device, a first part of the first preview image and a second part of the second preview image in a preview area, wherein the first part of the first preview image and the second part of the second preview image constitute the current picture.

2. The method according to claim 1, wherein the preview area comprises a first area and a second area; and the displaying comprises:
    displaying, by the terminal device, the first part of the first preview image in the first area based on a first resolution and displaying, by the terminal device, the second part of the second preview image in the second area based on a second resolution.

3. The method according to claim 1, wherein the method further comprises:
    displaying, by the terminal device, a division line in the preview area, wherein the division line divides the preview area into a first area and a second area; and the displaying, by the terminal device, a first part of the first preview image and a second part of the second preview image in a preview area comprises:
    displaying the first part of the first preview image in the first area and displaying the second part of the second preview image in the second area, wherein the first part is a partial content of the current picture which locates in the first area and the second part is another partial content of the current picture which locates in the second area.

4. The method according to claim 1, wherein the method further comprises:
    receiving, by the terminal device, a switching instruction; and
    displaying, by the terminal device according to the switching instruction, a third part of the first preview image and a fourth part of the second preview image in the preview area, wherein
    the third part of the first preview image and the first part of the first preview image constitute the first preview image, and the fourth part of the second preview image and the second part of the second preview image constitute the second preview image.

5. The method according to claim 1, wherein the method further comprises:
    displaying, by the terminal device, a division line in the preview area, wherein the division line locates between the first part of the first preview image and the second part of the second preview image; and
    in response to receive a movement instruction for the division line, moving, by the terminal device, the division line.

6. The method according to claim 1, wherein the method further comprises:
    displaying, by the terminal device, a division line in the preview area according to a sketching operation in the preview area, wherein the division line indicates dividing the first part of the first preview image and the second part of the second preview image.

7. The method according to claim 1, wherein the method further comprises:
    identifying, by the terminal device, at least one object comprised in the current picture;
    determining, by the terminal device, a contour of each of the at least one object; and
    displaying, by the terminal device, a division line in the preview area based on the contour of each of the at least one object, wherein the division line divides the preview area into a first area and second area, and the first area is configured to display the first part of the first preview image and the second area is configured to display the second part of the second preview image.

8. The method according to claim 1, wherein the method further comprises:
    displaying, by the terminal device, a full-screen identifier in the preview area; and
    in response to receiving a confirmation instruction for the full-screen identifier, displaying, by the terminal device, the first preview image or the second preview image in the preview area.

9. The method according to claim 1, wherein before the obtaining step, the method further comprises:
    determining, by the terminal device, an object in the current picture and a type of the object;
    determining, by the terminal device in a plurality of modes, a mode corresponding to the type of the object as the second mode.

10. The method according to claim 1, wherein before the obtaining step, the method further comprises:
    determining, by the terminal device, an object in the current picture and a type of the object;
    determining, by the terminal device in a plurality of modes, a mode corresponding to the type of the object as a candidate second mode;
    displaying, by the terminal device, prompt information, wherein the prompt information is used to prompt whether to agree on in the candidate second mode; and
    determining, by the terminal device, the candidate second mode as the second mode when the terminal device receives a confirmation instruction for the prompt information;
    displaying, by the terminal device, a selection list when the terminal device receives a first selection instruction, and determining the second mode according to a second selection instruction, wherein the selection list comprises at least one mode that is different from the candidate second mode, the first selection instruction is used to display the selection list, and the second selection instruction is used to determine the second mode in the selection list.

11. The method according to claim 1, wherein before the obtaining step, the method further comprises:
displaying, by the terminal device, multiple modes; and
determining, by the terminal device, the second mode upon receiving a mode selection instruction on any one of the multiple modes.

12. A terminal device, comprising
a non-transitory memory configured to store computer-readable instructions; and
one or more processors that when execute the computer-readable instructions cause the terminal device to:
obtain, by a terminal device, a first preview image and a second preview image, wherein the first preview image is based on a current picture in a first mode and the second preview image is based on the current picture in a second mode; and
display, by the terminal device, a first part of the first preview image and a second part of the second preview image in a preview area, wherein the first part of the first preview image and the second part of the second preview image constitute the current picture.

13. The terminal device according to claim 12, wherein the one or more processors further execute the computer-readable instructions to further cause the terminal device to:
display, by the terminal device, a division line in the preview area, wherein the division line divides the preview area into a first area and a second area; and
display the first part of the first preview image in the first area and displaying the second part of the second preview image in the second area, wherein the first part is a partial content of the current picture which locates in the first area and the second part is another partial content of the current picture which locates in the second area.

14. The terminal device according to claim 12, wherein the one or more processors further execute the computer-readable instructions to further cause the terminal device to:
receive, by the terminal device, a switching instruction; and
display, by the terminal device according to the switching instruction, a third part of the first preview image and a fourth part of the second preview image in the preview area, wherein
the third part of the first preview image and the first part of the first preview image constitute the first preview image, and the fourth part of the second preview image and the second part of the second preview image constitute the second preview image.

15. The terminal device according to claim 12, wherein the one or more processors further execute the computer-readable instructions to further cause the terminal device to:
identify, by the terminal device, at least one object comprised in the current picture;
determine, by the terminal device, a contour of each of the at least one object; and
displaying, by the terminal device, a division line in the preview area based on the contour of each of the at least one object, wherein the division line divides the preview area into a first area and second area, and the first area is configured to display the first part of the first preview image and the second area is configured to display the second part of the second preview image.

16. A non-transitory computer-readable storage medium, comprising computer readable instructions, wherein the computer readable instructions when executed by one or more processors cause the one or more processors to:
obtain, by a terminal device, a first preview image and a second preview image, wherein the first preview image is based on a current picture in a first mode and the second preview image is based on the current picture in a second mode; and
display, by the terminal device, a first part of the first preview image and a second part of the second preview image in a preview area, wherein the first part of the first preview image and the second part of the second preview image constitute the current picture.

17. The non-transitory computer-readable storage medium according to claim 16, wherein the computer readable instructions when executed by one or more processors further cause the one or more processors to:
display, by the terminal device, a division line in the preview area, wherein the division line divides the preview area into a first area and a second area; and
display the first part of the first preview image in the first area and displaying the second part of the second preview image in the second area, wherein the first part is a partial content of the current picture which locates in the first area and the second part is another partial content of the current picture which locates in the second area.

18. The non-transitory computer-readable storage medium according to claim 16, wherein the computer readable instructions when executed by one or more processors further cause the one or more processors to:
receive, by the terminal device, a switching instruction; and
display, by the terminal device according to the switching instruction, a third part of the first preview image and a fourth part of the second preview image in the preview area, wherein
the third part of the first preview image and the first part of the first preview image constitute the first preview image, and the fourth part of the second preview image and the second part of the second preview image constitute the second preview image.

19. The non-transitory computer-readable storage medium according to claim 16, wherein the computer readable instructions when executed by one or more processors further cause the one or more processors to:
identify, by the terminal device, at least one object comprised in the current picture;
determine, by the terminal device, a contour of each of the at least one object; and
displaying, by the terminal device, a division line in the preview area based on the contour of each of the at least one object, wherein the division line divides the preview area into a first area and second area, and the first area is configured to display the first part of the first preview image and the second area is configured to display the second part of the second preview image.

20. The non-transitory computer-readable storage medium according to claim 16, wherein the computer readable instructions when executed by one or more processors further cause the one or more processors to:
display, by the terminal device, a division line in the preview area according to a sketching operation in the preview area, wherein the division line indicates dividing the first part of the first preview image and the second part of the second preview image.

* * * * *